United States Patent
Masuda

(10) Patent No.: US 8,442,061 B2
(45) Date of Patent: May 14, 2013

(54) GATEWAY APPARATUS, INFORMATION COMMUNICATION METHOD, INFORMATION COMMUNICATION PROGRAM, AND INFORMATION COMMUNICATION SYSTEM

(75) Inventor: Yasuto Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 12/648,671

(22) Filed: Dec. 29, 2009

(65) Prior Publication Data

US 2010/0177779 A1    Jul. 15, 2010

(30) Foreign Application Priority Data

Jan. 15, 2009    (JP) .................................. 2009-006727

(51) Int. Cl.
*H04L 12/28* (2006.01)
*H04L 12/56* (2006.01)

(52) U.S. Cl.
USPC ........................................................ 370/401

(58) Field of Classification Search .................... 370/401
See application file for complete search history.

(56) References Cited

U.S. PATENT DOCUMENTS

| | | | | |
|---|---|---|---|---|
| 7,864,693 B2 * | 1/2011 | Burman et al. | ............... | 370/252 |
| 2004/0116131 A1 * | 6/2004 | Hochrainer et al. | ....... | 455/456.1 |
| 2004/0199649 A1 * | 10/2004 | Tarnanen et al. | ............. | 709/230 |
| 2005/0013281 A1 * | 1/2005 | Milton et al. | .................. | 370/349 |
| 2005/0193136 A1 * | 9/2005 | Burckart et al. | .............. | 709/230 |
| 2006/0171324 A1 * | 8/2006 | Mundra et al. | ................. | 370/252 |
| 2007/0123194 A1 * | 5/2007 | Karaoguz et al. | ............. | 455/403 |
| 2007/0173268 A1 * | 7/2007 | Le Bodic et al. | ............. | 455/466 |
| 2007/0218924 A1 * | 9/2007 | Burman et al. | ............... | 455/466 |
| 2007/0283048 A1 * | 12/2007 | Theimer et al. | ............... | 709/246 |
| 2008/0130549 A1 * | 6/2008 | Chindapol et al. | ............ | 370/315 |
| 2009/0129271 A1 * | 5/2009 | Ramankutty et al. | ......... | 370/235 |
| 2009/0213784 A1 * | 8/2009 | Ang | .............................. | 370/328 |
| 2009/0300205 A1 * | 12/2009 | Jabri | ............................. | 709/231 |
| 2010/0027416 A1 * | 2/2010 | Beauford | ...................... | 370/225 |
| 2010/0195666 A1 * | 8/2010 | Adamczyk et al. | ........... | 370/465 |

FOREIGN PATENT DOCUMENTS

| | | |
|---|---|---|
| JP | 11-88645 | 3/1999 |
| JP | 11088645 A * | 3/1999 |
| JP | 2004-310295 | 11/2004 |
| JP | 2005-130036 | 5/2005 |

OTHER PUBLICATIONS

Office Action issued Apr. 12, 2011, in Japanese Patent Application No. 2009-006727.

* cited by examiner

*Primary Examiner* — Andrew Lai
*Assistant Examiner* — Albert Shih
(74) *Attorney, Agent, or Firm* — Oblon, Spivak, McClelland, Maier & Neustadt, L.L.P.

(57) ABSTRACT

There is provided a gateway apparatus connected to at least one or more terminal devices in the same network, including a signaling module that relays transmission and reception of information until a communication session between a terminal device in the same network and a terminal device in another network has been established, a communication capability database in which capability information including at least information relating to communication capability of a plurality of terminal devices is registered, and a communication-capability determining module that caches the information relayed by the signaling module until the communication session between the terminal device in the same network and the terminal device in the another network has been established, and registers and manages, in the communication capability database, the capability information of the terminal device in the another network.

15 Claims, 13 Drawing Sheets

FIG.8

MESSAGE tel:0322222222 SIP/2.0
Via: SIP/2.0/UDP [2001:c90:625:1::1]:5060; branch=z9hG4bK4ebacb1a
Max-Forwards: 70
To: <tel:0322222222>
From: <sip:0311111111@abc.com;user=phone>;tag=4eba18fa
Call-ID: 4eba8f60-af57-11db-86b9-00e01836558f
CSeq: 1 MESSAGE
Contact: <sip:kxyabovm@[2001:c90:625:1::1]:5060>
Content-Type: application/cache-control
Content-Length: 12 remove all

FIG.9

INVITE tel:0322222222;cache-control=no-cache SIP/2.0
Via: SIP/2.0/UDP [2001:c90:625:1::1]:5060; branch=z9hG4bK4ebacb1a
Max-Forwards: 70
To: <tel:0322222222>
From: <sip:0311111111@abc.com;user=phone>;tag=4eba18fa
Call-ID: 4eba8f60-af57-11db-86b9-00e01836558f
CSeq: 1 INVITE
Supported: 100rel,timer
Allow: INVITE,ACK,BYE,CANCEL,PRACK,UPDATE
Contact: <sip:kxyabovm@[2001:c90:625:1::1]:5060>
Session-Expires: 300
Privacy: none
P-Preferred-Identity: <sip:0311111111@abc.com;user=phone>
Route: <sip:[2001:c90:0:1::1:1];lr>
Content-Type: application/sdp
Content-Length: 402 v=0
o=- 0 0 IN IP6 2001:c90:625:1:202:b3ff:fe08:e12d
s=-
c=IN IP6 2001:c90:625:1:202:b3ff:fe08:e12d
t=0 0
m=video 49154 RTP/AVP 105
b=AS:10240
a=sendrecv
a=rtpmap:105 H264/90000
a=fmtp:105 profile-level-id=428020; max_br=20000
m=audio 49152 RTP/AVP 98
b=AS:512
a=sendrecv
a=rtpmap:98 MP4A-LATM/96000a=fmtp:98 profile-level-id=31; bitrate=192000; object=2; cpresent=0;config=1010
a=ptime:10

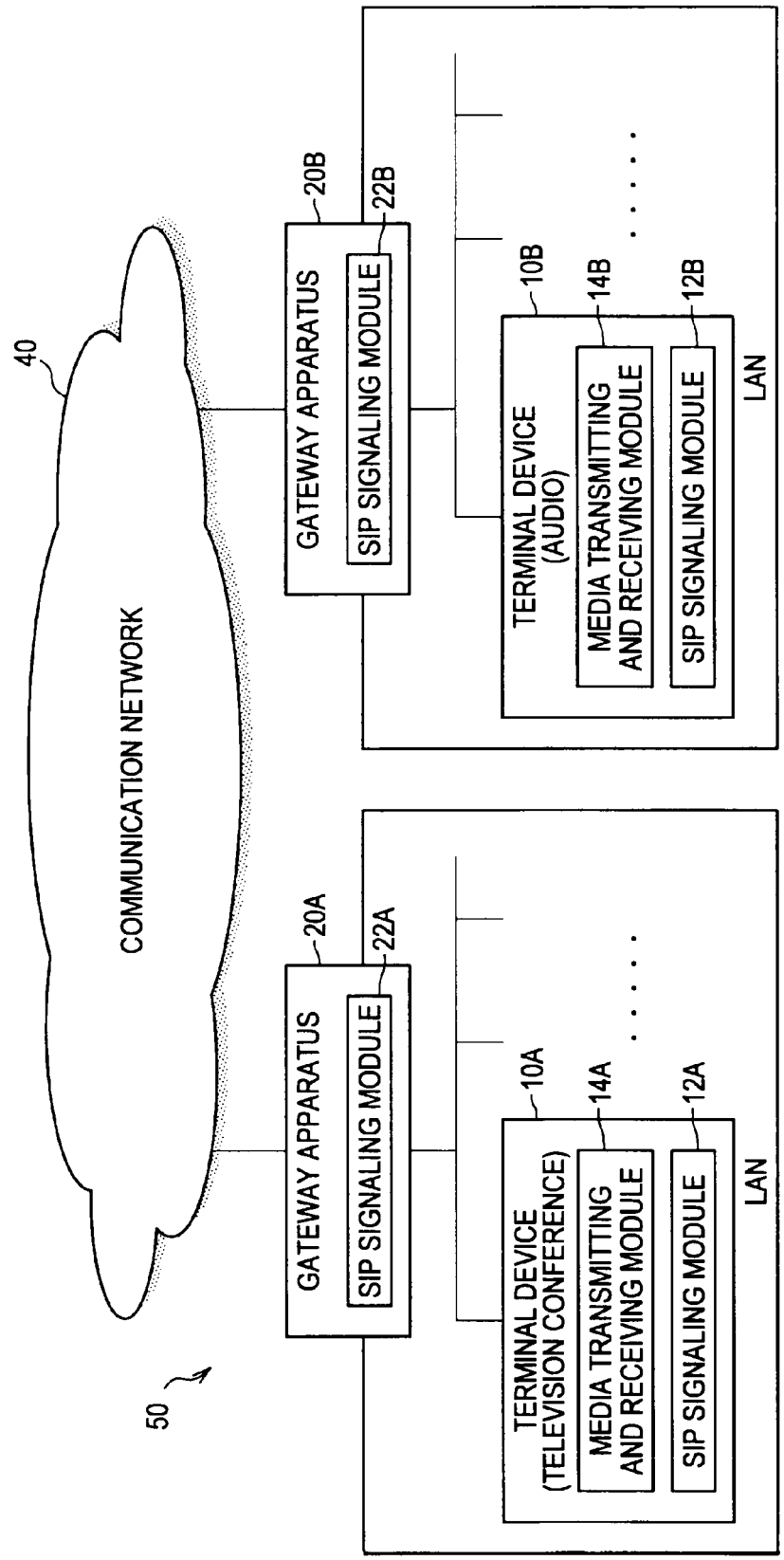

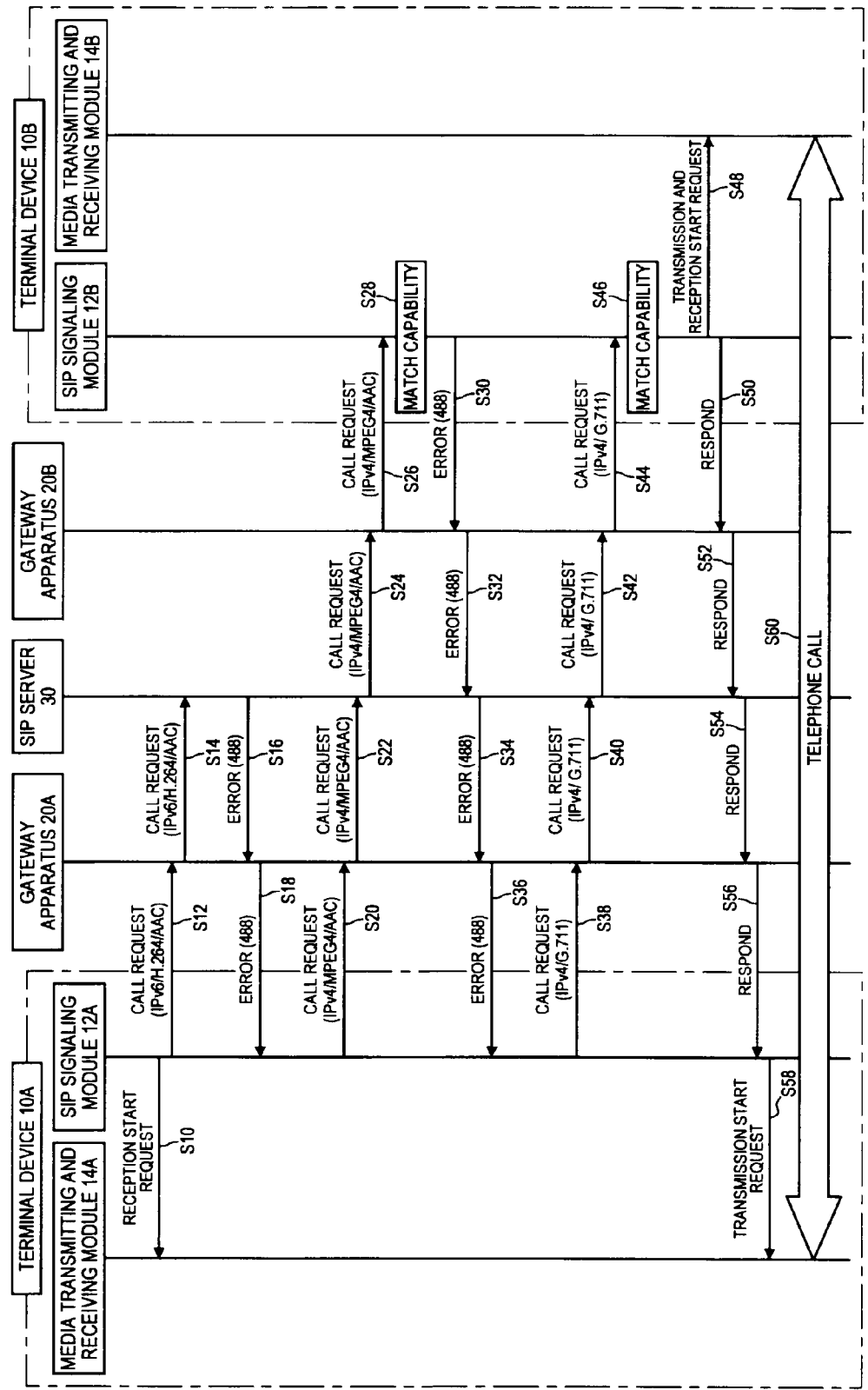

GATEWAY APPARATUS, INFORMATION COMMUNICATION METHOD, INFORMATION COMMUNICATION PROGRAM, AND INFORMATION COMMUNICATION SYSTEM

BACKGROUND OF THE INVENTION

1. Field of the Invention

The present invention relates to a gateway apparatus, an information communication method, an information communication program and an information communication system.

2. Description of the Related Art

For example, in an IP telephone network such as NGN (Next Generation Network), fallback processing may be needed due to a packet size of UDP (User Datagram Protocol), and the like. The fallback processing refers to processing of changing a condition that has caused an error and again making a telephone-call start request when a telephone-call start request fails for some reason. However, there is an issue that the fallback processing increases traffic of the network. Moreover, there is an issue that repeating the fallback processing prolongs time until the telephone call starts, which impairs convenience from the viewpoint of a user.

A technique for avoiding the above-described fallback processing is disclosed, for example, in Japanese Patent Application Laid-Open No. 2005-130036. In Japanese Patent Application Laid-Open No. 2005-130036, a communication terminal device is disclosed, in which a connection status of a communication destination is confirmed, and then an appropriate communication condition in accordance with the connection status of the communication destination can be selected from a plurality of communication conditions set in advance. The communication terminal device determines that the counterpart apparatus is connected to the IP telephone network by confirming whether or not the dialing code of a telephone number of the communication destination is "050". In this manner, the purpose in the communication terminal device described in Japanese Patent Application Laid-Open No. 2005-130036 is to determine whether or not the terminal device of the communication destination is connected to the IPT telephone network, to prevent a communication error as much as possible by changing the communication condition as necessary in accordance with the connection status, and to reduce the fallback processing.

SUMMARY OF THE INVENTION

However, the communication terminal device described in Japanese Patent Application Laid-Open No. 2005-130036 merely changes the communication condition such as a maximum data rate and a maximum symbol rate in accordance with the connection status to the IP telephone network of the counterpart terminal. Accordingly, for example, in some communication standards that the counterpart terminal device supports, the fallback processing may be performed between the terminal devices more than once until the communication has been established. As a result, there have been issues that time until a communication session between the terminal devices is established becomes longer, and that traffic of the communication network by the fallback processing is increased.

In light of the foregoing, it is desirable to provide a novel and improved gateway apparatus, information communication method, information communication program, and information communication system which make it possible to reduce the time until a communication session between terminal devices is established, and to suppress increase in traffic of a communication network due to fallback processing.

To solve the issues mentioned above, according to an embodiment of the present invention, there is provided a gateway apparatus connected to at least one or more terminal devices in the same network, including a signaling module that relays transmission and reception of information until a communication session between a terminal device in the same network and a terminal device in another network has been established, a communication capability database in which capability information including at least information relating to communication capability of a plurality of terminal devices is registered, and a communication-capability determining module that caches the information relayed by the signaling module until the communication session between the terminal device in the same network and the terminal device in the another network has been established, and registers and manages, in the communication capability database, the capability information of the terminal device in the another network.

With the above-described configuration, the signaling module of the gateway apparatus connected to at least the one or more terminal devices in the same network can relay the transmission and reception of the information until a communication session between a terminal device in the same network and a terminal device in another network has been established. Moreover, in the communication capability database included in the gateway apparatus, capability information including at least information relating to communication capability of a plurality of terminal devices is registered. Moreover, the communication-capability determining module can cache the information relayed by the signaling module until the communication session between the terminal device in the same network and the terminal device in the another network has been established, and register and manage, in the communication capability database, the capability information of the terminal device in the another network.

When a call request is made from a terminal device on the call requesting side in the same network to a terminal device in the another network the communication-capability determining module may search for the capability information of the terminal device on the call answering side from the communication capability database. The signaling module may determine whether or not the terminal device on the call answering side supports the communication standard of the call request, based on the capability information of the terminal device on the call answering side registered in the communication capability database. When it is determined that the communication standard is supported, the signaling module may transmit the call request to the terminal device on the call answering side, and when it is determined that the communication standard is not supported, the signaling module may transmit an error signal to the terminal device on the call requesting side.

The gateway apparatus may further include a timer module that manages a period during which the capability information is registered in the communication capability database for each of the terminal devices. Every time a communication session with a terminal device associated with capability information registered in the communication capability database is established, the timer module may reset the registration period of the capability information in the communication capability database and may remeasure the same.

The timer module may instruct the communication-capability determining module to erase the capability information from the communication capability database when the registration period of the capability information for a predetermined terminal device exceeds a predetermined period set in advance, and the communication-capability determining module may erase the corresponding capability information from the communication capability database in response to the instruction from the timer module.

In a case where a call request is made from the terminal device in the another network to the terminal device in the same network, when the communication standard of the call request and the communication standard included in the capability information of the terminal device in the another network, which is registered in the communication capability database, are different, the communication-capability determining module may update the capability information of the terminal device made the call request, which is registered in the communication capability database, to new capability information including the communication standard of the call request.

Furthermore, to solve the issues mentioned above, according to another embodiment of the present invention, there is provided an information processing method by a gateway apparatus, including the steps of relaying, by a gateway apparatus connected to at least one or more terminal devices, transmission and reception of information between a terminal device connected to the gateway apparatus in the same network and a terminal device in another network and establishing a communication session between the terminal devices, and caching the information transmitted and received between the terminal devices in the communication session-establishing step, and registering and managing, in a communication capability database, capability information including at least information relating to the communication capability of the terminal device in the another network.

Furthermore, to solve the issues mentioned above, according to still another embodiment of the present invention, there is provided an information processing program that causes a computer to perform communication-session establishing processing of relaying, by a gateway apparatus connected to at least one or more terminal devices, transmission and reception of information between a terminal device connected to the gateway apparatus in the same network and a terminal device in another network and establishing a communication session between the terminal devices, and communication-capability registering processing of caching the information transmitted and received between the terminal devices in the communication-session establishing processing, and registering and managing, in a communication capability database, capability information including at least information relating to the communication capability of the terminal device in the another network.

Furthermore, to solve the issues mentioned above, according to yet another embodiment of the present invention, there is provided an information communication system that establishes a communication session between terminal devices though a gateway apparatus. The terminal device includes a first signaling module that transmits a call request to a terminal device in another network toward the gateway apparatus connected to the terminal device in the same network, and the gateway apparatus includes a second signaling module that relays, in response to the call request from the first signaling module, transmission and reception of information until a communication session between the terminal device in the same network and the terminal device in the another network has been established, a communication capability database in which capability information including at least information relating to communication capability of a plurality of terminal devices is registered, and a communication-capability determining module that caches the information relayed by the second signaling module until the communication session between the terminal device in the same network and the terminal device in the another network has been established, and registers and manages the capability information of the terminal device in the another network in the communication capability database.

The communication-capability determining module may search for the capability information of the terminal device on the call answering side from the communication capability database in response to the call request from the first signaling module of the terminal device on a call requesting side in the same network. The second signaling module may determine whether or not the terminal device on the call answering side supports the communication standard of the call request, based on the capability information of the terminal device on the call answering side registered in the communication capability database. When it is determined that the communication standard is supported, the second signaling module may transmit the call request to the terminal device on the call answering side, and when it is determined that the communication standard is not supported, the second signaling module may transmit an error signal to the terminal device on the call requesting side, and the first signaling module of the terminal device on the call requesting side may retransmit a call request based on a different communication standard to the gateway apparatus in response to reception of the error signal.

When the first signaling module transmits, to the gateway apparatus, the call request including information commanding not to use the capability information therein, the second signaling module may transmit the call request to the terminal device on the call answering side, without determining whether or not the terminal device on the call answering side supports the communication standard on the call requesting side based on the capability information.

When the communication standard supported by the terminal device is updated, the first signaling module may transmit an erasure command of the capability information to the gateway apparatus in the network different from that of the terminal device, and the communication-capability determining module of the gateway apparatus that has received the erasure command may erase the capability information related to the erasure command from the communication capability database.

The information communication system may further include a communication capability server that collectively manages the capability information registered in the communication capability databases included in the plurality of gateway apparatuses. The communication-capability determining module of each of the gateway apparatuses may register the capability information of the predetermined terminal device in the communication capability database and then, may transmit the capability information to the communication capability server, and the communication capability server may manage the capability information received from the communication-capability determining module of the gateway apparatus.

When the capability information of the terminal device on the call answering side is not registered in the communication capability database, the communication-capability determining module of the gateway apparatus may acquire the capability information of the terminal device on the call answering side from the communication capability server, and may register the capability information in the communication capability database.

According to the present invention as described above, by managing the capability information of terminal devices by the gateway apparatus, it is possible to reduce the time until the communication session between the terminal devices is established and to suppress increase in traffic of the communication network due to the fallback processing.

BRIEF DESCRIPTION OF THE DRAWINGS

FIG. 8 is an explanatory diagram showing an example of message information transmitted from the terminal device 100B' in the information communication system 500 of Modification 1;

FIG. 9 is an explanatory diagram showing an example of message information transmitted from the terminal device 100 in the information communication system 500 of Modification 2;

FIG. 12 is an explanatory diagram showing a schematic configuration of a related-art information communication system 50;

FIG. 13 is a sequence diagram showing a general flow of fallback processing performed when communication is started between terminals in the related-art information communication system 50.

DETAILED DESCRIPTION OF THE EMBODIMENTS

Figure 1:
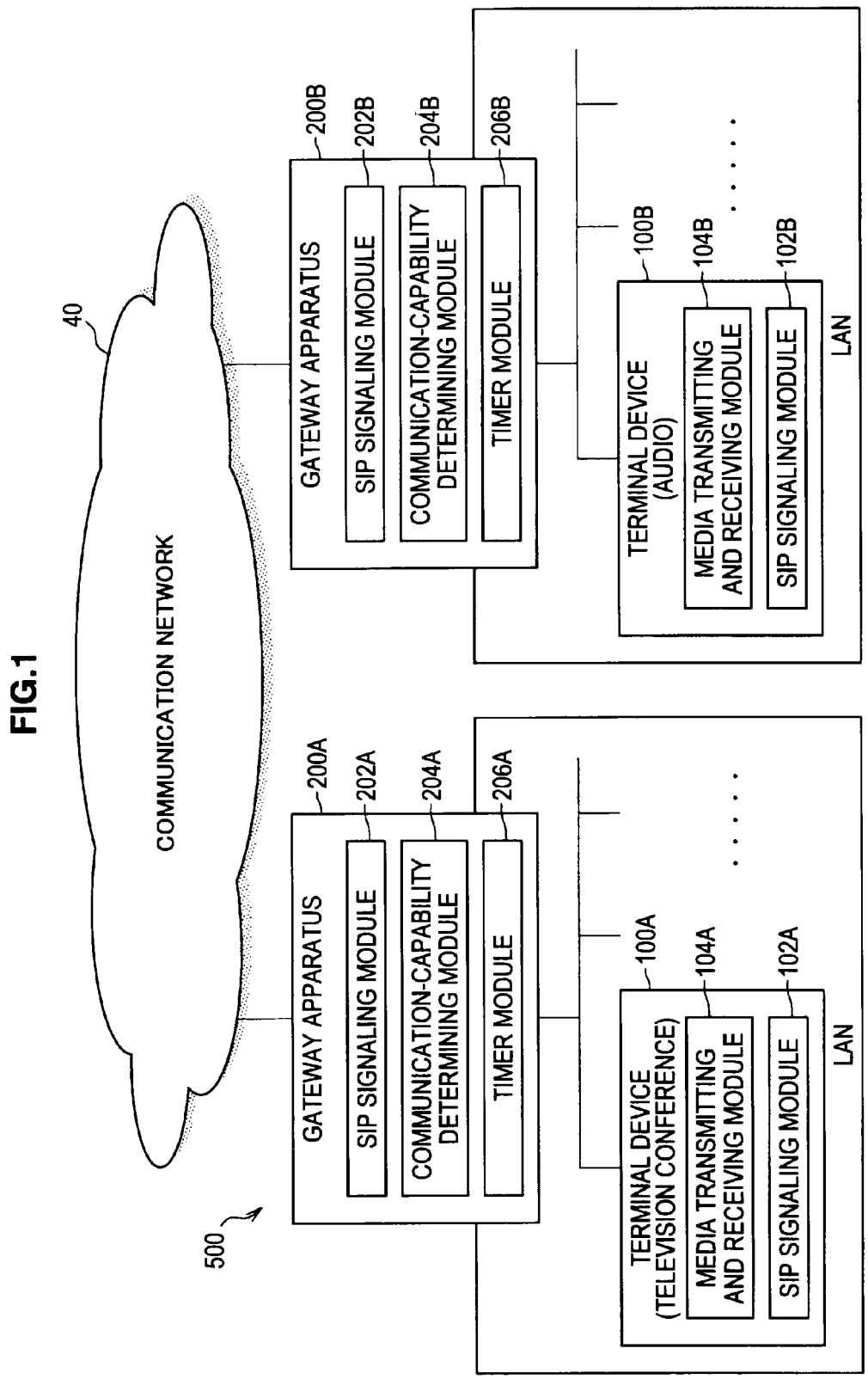
FIG. 1 is an explanatory diagram showing a schematic configuration of an information communication system 500 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation is made in the following order:
1. Overview of an embodiment of the present invention
2. Overview of the information communication system 500
3. Flow of telephone-call start processing in the information communication system 500
   3-1. Flow of processing of caching a result of fallback processing
   3-2. Flow of processing of establishing a communication session based on capability information.
   3-3. Flow of erasure processing of capability information by a timer
4. Modifications
   4-1. Modification 1 (an example in which capability information is updated in accordance with update of a communication standard of a terminal device)
   4-2. Modification 2 (an example in which the use of capability information is limited)
   4-3. Modification 3 (an example in which capability information of a plurality of gateway apparatuses 200 is collectively managed)
5. Hardware configuration of the terminal device 100 and the gateway apparatus 200
6. Conclusion <1. Overview of an Embodiment of the Present Invention>

First, issues in the related art are clarified, and overview of the information communication system 500 according to an embodiment of the present invention is described.

FIG. 12 is an explanatory view showing a schematic configuration of the related-art information communication system 50. As shown in FIG. 12, in a home LAN or a corporate LAN, at least one or more terminal devices 10 are connected to a communication network 40 through gateway apparatuses 20. In the example shown in FIG. 12, a terminal device 10A is, for example, a terminal device for television conference that supports H.264 (a moving image compression standard), MPEG4 (Video/Audio) and the like. On the other hand, a terminal device 10B is a terminal device for G.711 (audio encoding standard)voice telephone that only supports IPv4. A flow of processing when in the above-described related-art information communication system 50, a user of the terminal device 10A starts a telephone call with a user of the terminal device 10B through the communication network 40 is described below.

FIG. 13 is a sequence diagram showing a general flow of the fallback processing performed when the communication is started between the terminal devices 10 in the related-art information communication system 50 shown in FIG. 12. The sequent diagram shown in FIG. 13 shows an example in which the terminal device 10A is on the call requesting side and the terminal device 10B is on the call answering side. However, when the terminal device 10A is on the call answering side, and the terminal device 10B is on the call requesting side, the similar processing is also performed.

As shown in FIG. 13, in step 10, an SIP signaling module 12A included in the terminal device 10A requests reception start to a media transmitting and receiving module 14A in response to a telephone-call start instruction from the user. At the same time, the SIP signaling module 12A makes a call to the terminal device 10B with IPv6/H.264/MPEG4-AAC. That is, the SIP signaling module 12A transmits a call request to an SIP server 30 through a gateway apparatus 20A in steps 12 and 14.

Here, since the SIP server 30 recognizes that the terminal device 10B is the terminal device that only supports IPv4, the SIP server 30 transmits an error signal (an error code 488 or the like) to the terminal device 10A through the gateway apparatus 20A in steps 16 and 18.

As a result, the SIP signaling module 12A of the terminal device 10A changes a call condition and again makes a telephone-call start request (fallback processing). Specifically, the SIP signaling module 12A again makes a call to the terminal device 10B with IPv4/MPEG4-Video/MPEG4-AAC. That is, the SIP signaling module 12A transmits a call request to the SIP server 30 through the gateway apparatus 20A in steps 20 and 22. Since the SIP server 30 recognizes that the terminal device 10B is the terminal device that supports IPv4, in response, the SIP server 30 transmits the call request from the terminal device 10A to the terminal device 10B through a gateway apparatus 20B in steps 24 and 26.

In response, in step 28, a SIP signaling module 12B of the terminal device 10B performs capability matching processing of determining whether or not the communication standard of the call request received from the terminal device 10A is supported by its own terminal. In the example shown in FIG. 13, since the terminal device 10B is a terminal device for G.711 voice telephone that only supports IPv4, the SIP signaling module 12B transmits an error signal to the terminal device 10A in steps 30, 32, 34 and 36.

As a result, the SIP signaling module 12A of the terminal device 10A changes the call condition, and again makes a telephone-call start request (fallback processing). Specifically, the SIP signaling module 12A again makes a call to the terminal device 10B with IPv4/G.711. That is, in steps 38, 40, 42 and 44, a call request is transmitted from the terminal device 10A to the terminal device 10B through the gateway apparatus 20A, the SIP server 30 and the gateway apparatus 20B.

In response, the SIP signaling module 12B of the terminal device 10B again performs the capability matching processing in step 46. In the example shown in FIG. 13, since the terminal device 10B is the terminal device for G.711 voice telephone that only supports IPv4, the SIP signaling module 12B determines that a telephone call with the terminal device 10A can be started. That is, the SIP signaling module 12B requests transmission and reception start to a media transmitting and receiving module 14B in step 48. Moreover, the SIP signaling module 12B transmits a response signal to the terminal device 10A in steps 50, 52, 54 and 56.

Thereafter, the SIP signaling module 12A of the terminal device 10A requests transmission start to the media transmitting and receiving module 14A in step 58. As a result, in step 60, a communication session between the terminal device 10A and the terminal device 10B is established.

As described above, in the related-art information communication system 50, it is necessary to perform the fallback processing until the capability of the terminal device on the call requesting side matches with the capability of the counterpart terminal device when the communication session is established. This causes issues that time until the telephone call start becomes longer, and that the call request signal, the error signal and the like increase traffic of the communication network 40.

By using the information communication system 500 according to an embodiment of the present invention, it is possible to solve the above-described issues. Specifically, each of the gateway apparatuses 200 caches results of past fallback processing to thereby manage information relating to communication capability of each of the terminal devices 100 as a database. This allows the gateway apparatus 200 to perform the capability matching processing to the counterpart terminal device 100 when the terminal device 100 transmits a call request. Accordingly, the fallback processing needed until the establishment of the communication session can be performed between the terminal device 100 and the gateway apparatus 200.

That is, by caching the result of the fallback processing by the gateway apparatus 200, the fallback processing needed until the establishment of the communication session can be performed between the terminal device 100 and the gateway apparatus 200. Consequently, by the use of the information communication system 500 according to an embodiment of the present invention, it is possible to reduce the time until the communication session between the terminal devices 100 is established, and to suppress increase in traffic due to the fallback processing.

Hereinafter, details of the information communication system 500 having the above-described characteristics are described.

<2. Schematic Configuration of the Information Communication System 500>

FIG. 1 is an explanatory diagram showing a schematic configuration of the information communication system 500 according to an embodiment of the present invention. As shown in FIG. 1, in the information communication system 500 according to the present embodiment, at least one or more terminal devices 100 are connected to the communication network 40 through the gateway apparatus 200 in a home LAN or a corporate LAN, as in the foregoing related-art information communication system 50. As shown in FIG. 1, in the same LAN, a plurality of terminal devices 100 are connected to the one gateway apparatus 200. That is, the plurality of terminal devices 100 are connected to the communication network 40 through the same gateway apparatus 200. While the communication network 40 is assumed to be an IP telephone network such as NGN (Next Generation Network), it may be, for example, a VoIP service through an SIP server on the internet, and the like, and thus, it is not limited to a specific communication network.

Moreover, in the example shown in FIG. 1, a terminal device 100A is, for example, a terminal device for television conference that supports H.264 (moving image compression standard), MPEG4 (Video/Audio) and the like. On the other hand, a terminal device 100B is a terminal device for G.711 (audio encoding standard) voice telephone that only supports IPv4. In the following explanation, an example in which a communication session is established through an SIP (Session Initiation Protocol) server 300 between the terminal device 100A for television conference and the terminal device 100B for voice telephone is described.

As shown in FIG. 1, each of the terminal devices 100 includes an SIP signaling module 102, and a media transmitting and receiving module 104. Each of the gateway apparatuses 200 includes an SIP signaling module 202, a communication-capability determining module 204, and a timer module 206. Hereinafter, details of respective functional components of the terminal device 100 and the gateway apparatus 200 are described.

(Terminal Device 100)

The SIP signaling module 102 performs call control (signaling) between the terminal devices 100. That is, the SIP signaling module 102 establishes a communication session with a predetermined terminal device 100 in response to an instruction from a user. The SIP signaling module 102, for example, operates as a functional module of UAC (User Agent Client) that requests telephone call start. Moreover, the SIP signaling module 102, for example, can also operate as a functional module of UAS (User Agent Server) that generates a response to a received request.

The media transmitting and receiving module 104 transmits and receives predetermined media data after the communication session between the terminal devices 100 has been established. The media transmitting and receiving module 104 transmits the media data such as audio and video to the terminal device 100 of a communication destination, based on a communication protocol such as RTP (Real-time Transport Protocol), for example. Types of the media data that the media transmitting and receiving module 104 can transmit and the communication protocol thereof are not limited to specific ones. That is, since the purpose in the information communication system 500 according to the present embodiment is to reduce time until the establishment of the communication session and to suppress traffic, transmission and reception method of the media data after the communication session establishment and the like are not limited to specific ones.

(Gateway Apparatus 200)

The SIP signaling module 202 performs call control (signaling) between the terminal devices 100 as in the SIP signaling module 102 of the above-described terminal device 100. That is, the SIP signaling module 202 relays transmission and reception of a call request, an error signal, a response signal and the like between the terminal devices 100 through the SIP server 300.

As described above, in the present embodiment, it is one of characteristics that the gateway apparatus 200 caches a result of the fallback processing, so that the next fallback processing is performed between the terminal device 100 and the gateway apparatus 200 based on cached information. Accordingly, the SIP signaling module 202 instructs the communication-capability determining module 204 described later to cache the result of the fallback processing when a communication session between the terminal devices 100 is established.

Moreover, when a call request is made from the terminal device 100A on the call requesting side, an SIP signaling module 202A instructs searching for capability information (the result of the fallback processing) of the terminal device 100B on the call answering side to a communication-capability determining module 204A. Thereafter, when the capability information of the terminal device 100B on the call answering side is not cached, the SIP signaling module 202A performs the fallback processing as usual. When the capability information of the terminal device 100B on the call answering side is cached, the fallback processing is performed between the terminal device 100A and the gateway apparatus 200A, based on the cached information. Details of flows of various types of processing by the SIP signaling module 202 will be described later with reference to processing sequence diagrams.

The communication-capability determining module 204 registers and manages the capability information of the respective terminal devices 100 in a communication capability database. As described above, when the communication session between the terminal devices 100 is established, the communication-capability determining module 204 receives an instruction to cache the result of the fallback processing from the SIP signaling module 202. In response, the communication-capability determining module 204 caches the result of the fallback processing, and registers and manages, in the communication capability database, the capability information for each of the terminal devices 100. As the capability information managed by the communication-capability determining module 204, for example, address information of the terminal devices, communication protocol information, video codec information, audio codec information and the like are included. In this manner, in the communication capability database managed by the gateway apparatus 200, the capability information including at least the information relating to communication capability of a plurality of terminal devices 100 is registered.

Moreover, the communication-capability determining module 204 searches for the capability information of the predetermined terminal device 100 from the communication capability database in response to the instruction from the SIP signaling module 202, and transfers the searching result to the SIP signaling module 202. This allows the SIP signaling module 202 to determine whether or not the fallback processing can be performed between the terminal device 100 and the gateway apparatus 200.

Moreover, in the case where the capability information relating to the predetermined terminal device 100 has not been used for a predetermined time, the communication-capability determining module 204 can also automatically erase the capability information from the communication capability database. The capability-information determining module 204 erases, from the communication capability database, the capability information not used for the predetermined period in accordance with a registration period of the capability information managed by the timer module 206 described later. Thereby, the old capability information for which no communication session has been established for the predetermined period can be automatically erased. Details of flows of various types of processing by the communication-capability determining module 204 will be described with reference to the processing sequence diagrams.

The timer module 206 manages a recording period of the capability information registered in the communication capability database managed by the communication-capability determining module 204. The timer module 206 starts measurement of the registration period of the predetermined capability information, and updates the registration period in response to an instruction from the communication-capability determining module 204. Moreover, when the period during which the predetermined capability information is registered in the communication capability database exceeds an expiration period set in advance, the timer module 206 instructs the erasure of the capability information of interest to the communication-capability determining module 204. In response, the communication-capability determining module 204 can automatically erase, from the communication capability database, the old capability information for which no communication session has been established for the predetermined period. Details of flows of various types of processing by the timer module 206 will be described with reference to the processing sequence diagrams.

<3. Flow of Telephone-Call Start Processing in the Information Communication System 500>

Next, a flow of processing when in the foregoing information communication system 500, a user of the terminal device 100A starts a telephone call with a user of the terminal device 100B through the communication network 40 is described below.

[3-1. Flow of Processing of Caching a Result of Fallback Processing]

Figure 2:
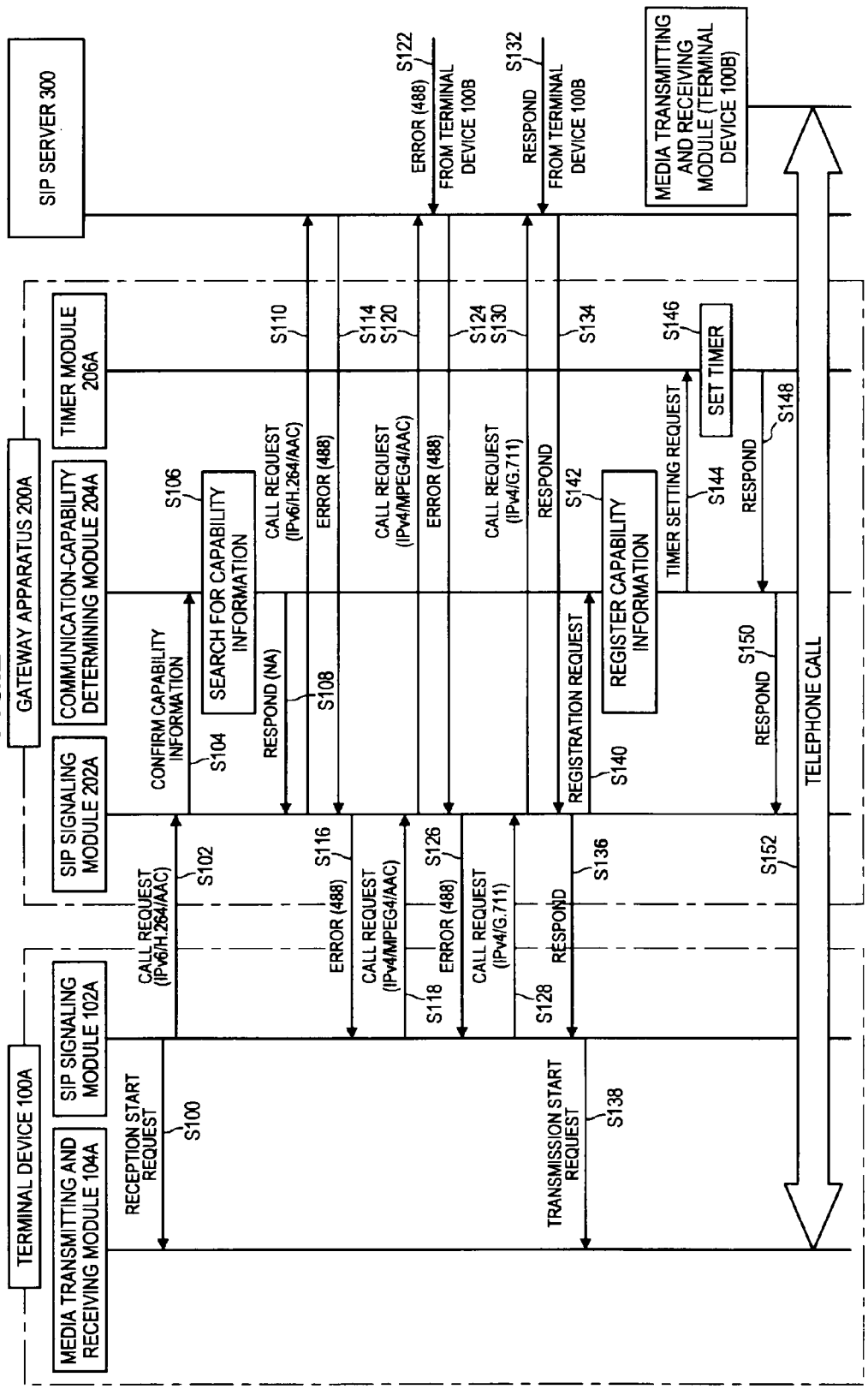
FIG. 2 is a sequence diagram showing an example of a flow of processing in which a gateway apparatus 200 caches a result of fallback information in the information communication system 500 according to the embodiment.

First, a flow of caching processing of the result of the fallback information performed when a communication session is established between the terminal device 100A and the terminal device 100B is described with reference to the sequence diagram of FIG. 2. FIG. 2 is a sequence diagram showing an example of a flow of the processing in which the gateway apparatus 200A caches the result of the fallback information in the information communication system 500 according to the present embodiment. Accordingly, FIG. 2 shows an example of the processing when a call request is made from the terminal device 100A to the terminal device 100B in a state where the capability information relating to the terminal device 100B is not recorded on the communication capability database managed by the gateway apparatus 200A.

In the sequence diagram shown in FIG. 2, for convenience of explanation, processing by a gateway apparatus 200B and the terminal device 100B on the call answering side is omitted. Needless to say, in the present embodiment as well, the transmission and reception processing of various signals is performed between the SIP server 300, the gateway apparatus 200B, and the terminal device 100B on the call answering side, as in the related-art information communication system 50 shown in FIG. 13.

First, in step 100, an SIP singling module 102A of the terminal device 100A requests reception start to a media transmitting and receiving module 104A in response to a telephone-call start instruction from the user. At the same time, the SIP signaling module 102A makes a call to the terminal device 100B with IPv6/H.264/MPEG4-AAC. That is, the SIP signaling module 102A transmits a call request to the gateway apparatus 200A in step 102.

In response, in step 104, the SIP signaling module 202A of the gateway apparatus 200A commands, to the communication-capability determining module 204A, the searching for the capability information relating to the terminal device 100B from the communication capability database. The communication-capability determining module 204A then searches for the capability information relating to the terminal device 100B from the communication capability database in step S106, and transmits a searching result to the SIP signaling module 202A in step 108.

Here, in the example shown in FIG. 2, the capability information relating to the terminal device 100B is not recorded on the communication capability database. Accordingly, the SIP signaling module 202A determines that the fallback processing may not be performed between the terminal device 100A and the gateway apparatus 200A, based on the searching result received from the communication-capability determining module 204A. As a result, the SIP signaling module 202A establishes a communication session with the terminal device 100B by the processing in steps 110 to 138 similarly to the foregoing related-art method.

Specifically, in step 110, a call request based on IPv6/H.264/MPEG4-AAC is transmitted to the SIP server 300. In response, the SIP server 300 transmits an error signal (error code 488 or the like) to the terminal device 100A through the gateway apparatus 200A in steps 114 and 116.

As a result, the SIP signaling module 102A of the terminal device 100A changes the call condition to again make a telephone-call start request (fallback processing). Specifically, the SIP signaling module 102A again makes a call to the terminal device 100B with IPv4/MPEG4-Video/MPEG4-AAC. That is, the SIP signaling module 102A transmits a call request to the SIP server 300 through the gateway apparatus 200A in steps 118 and 120. Thereafter, an SIP signaling module 102B of the terminal device 100B that has received the call request from the SIP server 300 performs the capability matching processing of determining whether or not the communication standard of the call request received from the terminal device 100A is supported by its own terminal. Since the terminal device 100B is the terminal device for G.711 voice telephone that only supports IPv4, the SIP signaling module 102B transmits an error signal to the terminal device 100A in steps 122, 124 and 126.

As a result, the SIP signaling module 102A of the terminal device 100A changes the call condition to again make a telephone-call start request (fallback processing). Specifically, the SIP signaling module 102A again makes a call to the terminal device 100B with IPv4/G.711. That is, in steps 128 and 130, a call request from the terminal device 100A is transmitted to the SIP server 300 through the gateway apparatus 200A. Thereafter, the SIP signaling module 102B of the terminal device 100B that has received the call request from the SIP server 300 performs the capability matching processing again. Since the terminal device 100B is the terminal device for G.711 voice telephone that only supports IPv4, the SIP signaling module 102B determines that the telephone call with the terminal device 100A can be started. That is, the SIP signaling module 102B transmits a response signal to the terminal device 100A in steps 132, 134 and 136.

Thereafter, the SIP signaling module 102A of the terminal device 100A requests transmission start to the media transmitting and receiving module 104A in step 138.

Moreover, as described above, in the information communication system 500 according to the present embodiment, it is one of characteristics that the gateway apparatus 200A caches the result of the fallback processing. Specifically, in step 140, the SIP signaling module 202A of the gateway apparatus 200A instructs the communication-capability determining module 204A to register the result of the fallback processing in the communication capability database.

In response, the communication-capability determining module 204A registers the result of the fallback processing in the communication capability database in step 142. The communication-capability determining module 204A, for example, can extract predetermined information recorded on a response message finally transmitted from the terminal device 100B and can register the extracted information in the communication-capability database as the capability information relating to the terminal device 100B.

Figure 3:
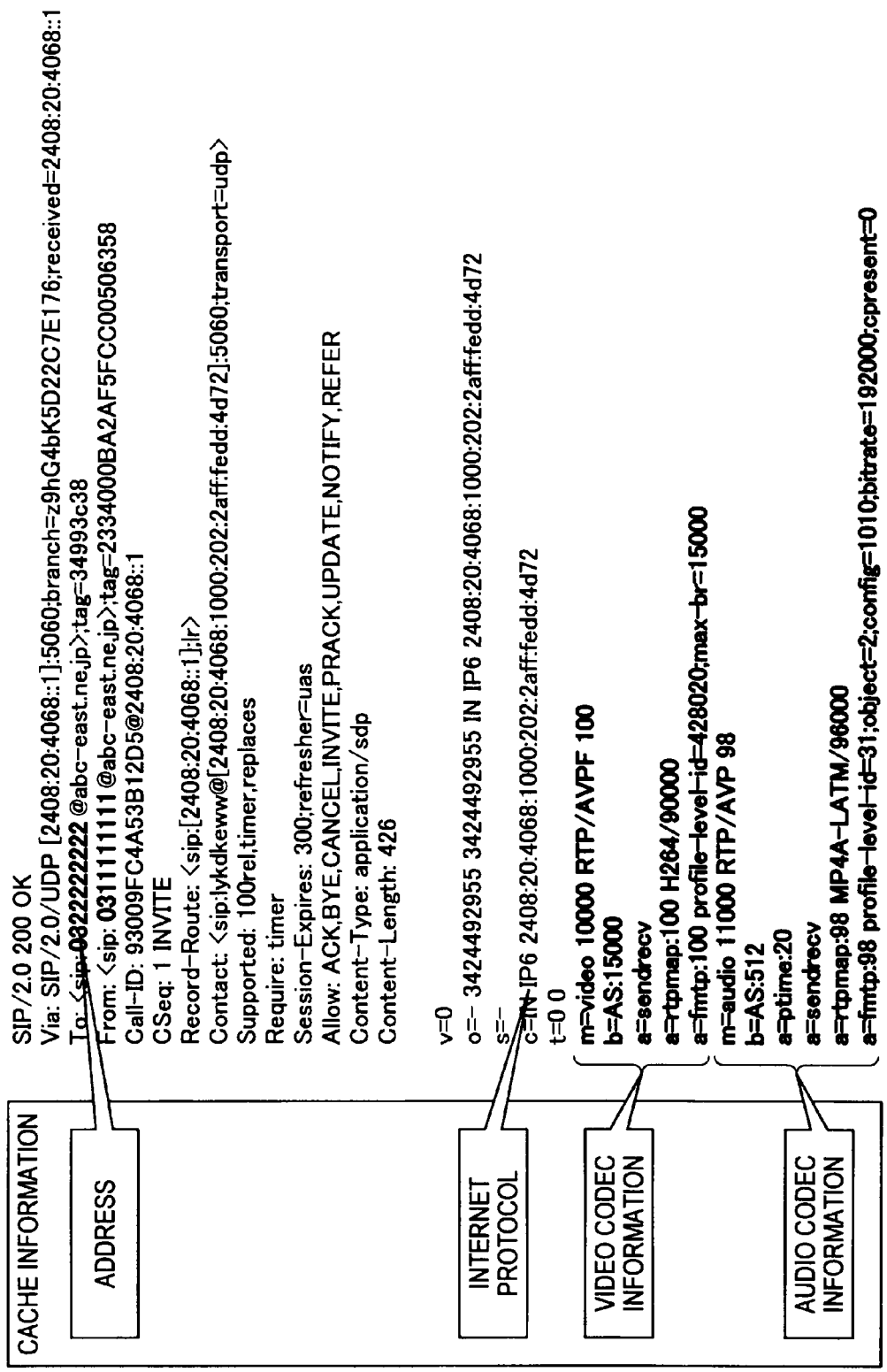
FIG. 3 is an explanatory diagram showing one example of capability information that the gateway apparatus 200 caches in the information communication system 500 according to the embodiment.

FIG. 3 is an explanatory diagram showing an example of the capability information cached by the gateway apparatus 200. The information shown in FIG. 3 is an example of the response message finally transmitted from the terminal device 100 on the call answering side. The communication-capability determining module 204 of the gateway apparatus 200, for example, extracts only the address information, the communication protocol information, the video codec information and the audio codec information from the message information shown in FIG. 3 to register in the communication-capability database as the capability information. As a result, by referring to the capability information, the gateway apparatus 200 can recognize the communication protocol that can be supported by the terminal device 100 associated with the capability information, a communication band, media information and the like. Moreover, by extracting only the information necessary for the establishment of the communication session from the response message information finally transmitted from the terminal device 100 on the call answering side, it is possible to reduce the time of registration processing and to simplify the database.

The message information shown in FIG. 3 is an example for explaining the present embodiment, and the content of the message information, types of the information extracted as the capability information and the like are not limited to these. For example, in the example shown in FIG. 2, as the capability information relating to the terminal device 100B on the call answering side, the information relating to the communication condition (IPv4/G.711) on which the communication session could be finally established, and the like are registered in the communication capability database.

Referring again to the processing sequence of FIG. 2, in step 144, the communication-capability determining module 204A, after registering the capability information, instructs measurement start of the registration period of the capability information to a timer module 206A. In response, the timer module 206A starts the measurement of the registration period of the capability information relating to the terminal device 100B in step 146, and transmits a response signal in steps 148 and 150. Details of the processing of automatically erasing the capability information based on the information relating to the registration period managed by the timer module 206A will be described later.

As a result of the above-described processing, in step 152, the communication session is established between the terminal device 100A and the terminal device 100B. In this manner, in the information communication system 500, when the communication session is established, the gateway apparatus 200 can cache the information relating to the result of the fallback processing to register in the communication capability database as the capability information of the terminal device 100 on the call answering side. In the example shown in FIG. 2, obviously, the gateway apparatus 200B connected to the terminal device 100B on the call answering side can similarly cache information relating to a result of fallback processing to register in a communication capability database as capability information of the terminal device 100A on the call requesting side.

[3-2. Flow of Processing of Establishing a Communication Session Based on Capability Information]

Next, a flow of the processing is described, in which the fallback processing between the terminal device 100A and the gateway apparatus 200A is performed based on the capability information registered by the processing in FIG. 2 to establish a communication session.

Figure 4:
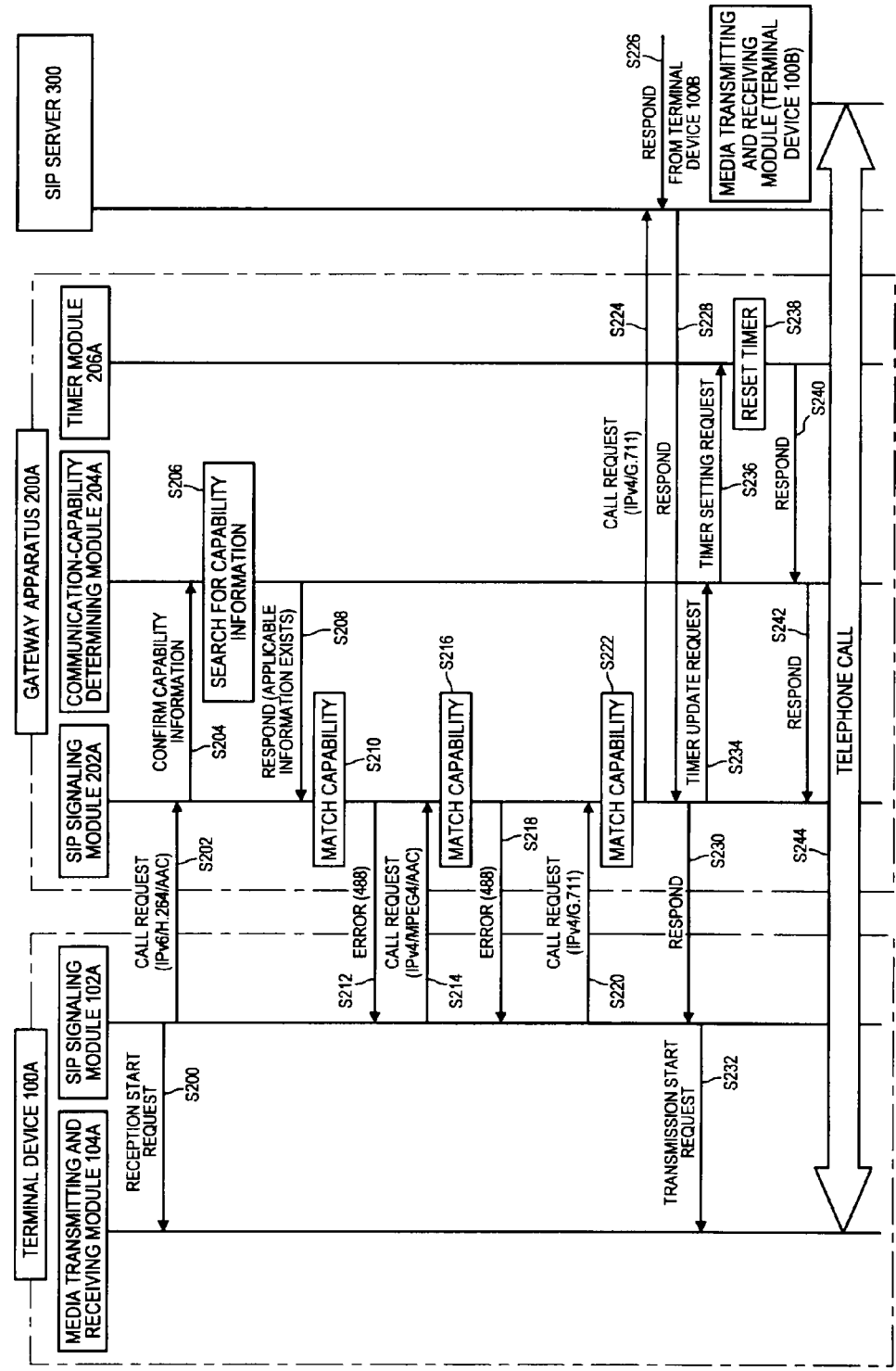
FIG. 4 is a sequence diagram showing an example of a flow of processing in which a communication session is established based on the capability information registered in the gateway apparatus 200 in the information communication system 500 according to the embodiment.

FIG. 4 is a sequence diagram showing an example of the flow of the processing of establishing the communication session based on the capability information registered in the gateway apparatus 200, in the information communication system 500 according to the present embodiment. Accordingly, FIG. 4 shows an example of the flow of the processing when a call request is made from the terminal device 100A to the terminal device 100B in a state where the capability information relating to the terminal device 100B is recorded on the communication capability database managed by the gateway apparatus 200A.

In the sequence diagram shown in FIG. 4, for convenience of explanation, the processing by the gateway apparatus 200B and the terminal device 100B on the call answering side is omitted. Needless to say, in the present embodiment as well, the transmission and reception processing of various signals is performed between the SIP server 300 and the gateway apparatus 200B and the terminal device 100B on the call answering side, as in the related-art information communication system 50 shown in FIG. 13.

First, in step 200, the SIP singling module 102A of the terminal device 100A requests reception start to the media transmitting and receiving module 104A in response to a telephone-call start instruction from the user. At the same time, the SIP signaling module 102A makes a call to the terminal device 100B with IPv6/H.264/MPEG4-AAC. That is, the SIP signaling module 102A transmits a call request to the gateway apparatus 200A in step 202.

In response, in step 204, the SIP signaling module 202A of the gateway apparatus 200A instructs the communication-capability determining module 204A to search for the capability information relating to the terminal device 100B from the communication capability database. The communication-capability determining module 204A then searches for the capability information relating to the terminal device 100B from the communication capability database in step 5206, and transmits a searching result to the SIP signaling module 202A in step 208.

Here, by the processing shown in FIG. 2, the capability information relating to the terminal device 100B has been recorded on the communication capability database managed by the gateway apparatus 200A. Accordingly, the communication-capability determining module 204A transmits the searched capability information relating to the terminal device 100B to the SIP signaling module 202A in step 208.

Thereafter, in step S210, the SIP signaling module 202A performs the capability matching processing of determining whether or not the communication standard of the call request received from the terminal device 100A is supported by the terminal device 100B, based on the capability information relating to the terminal device 100B. Since the terminal device 100B is the terminal device for G.711 voice telephone that only supports IPv4, the SIP signaling module 202A transmits an error signal to the terminal device 100A in step 212.

As a result, the SIP signaling module 102A of the terminal device 100A changes the call condition to again make a telephone-call start request (fallback processing). Specifically, the SIP signaling module 102A again makes a call to the terminal device 100B with IPv4/MPEG4-Video/MPEG4-AAC. That is, the SIP signaling module 102A transmits a call request to the gateway apparatus 200A in step 214.

In response, in step 216, the SIP signaling module 202A again performs the capability matching processing, based on the capability information relating to the terminal device 100B. Here, since the terminal device 100B is the terminal device for G.711 voice telephone that only supports IPv4, the SIP signaling module 202A transmits an error signal to the terminal device 100A in step 218.

As a result, the SIP signaling module 102A of the terminal device 100A changes the call condition to again make a telephone-call start request (fallback processing). Specifically, the SIP signaling module 102A again makes a call to the terminal device 100B with IPv4/G.711. That is, the SIP signaling module 102A transmits a call request to the gateway apparatus 200A in step 220.

In response, in step 222, the SIP signaling module 202A again performs the capability matching processing, based on the capability information relating to the terminal device 100B. Here, since the terminal device 100B is the terminal device for G.711 voice telephone that only supports IPv4, the SIP signaling module 202A determines that the telephone call with the terminal device 100B can be started. That is, the SIP signaling module 202A transmits a call request to the terminal device 100B through the SIP server 300 in step 224.

Thereby, the SIP signaling module 102B of the terminal device 100B that has received the call request from the SIP server 300 can determine that the telephone call with the terminal device 100A can be started, by performing the capability matching processing. Accordingly, the SIP signaling module 102B transmits a response signal to the terminal device 100A in steps 226, 228 and 230.

Thereafter, the SIP signaling module 102A of the terminal device 100A requests transmission start to the media transmitting and receiving module 104A in step 232.

Moreover, as described above, in the information communication system 500 according to the present embodiment, it is one of characteristics that by managing the registration period of the capability information recorded on the communication capability database, the old capability information is automatically erased. Accordingly, in steps 234 and 236, the SIP signaling module 202A of the gateway apparatus 200A instructs the timer module 206A to update the registration period of the capability information relating to the terminal device 100B. In response, in step 238, the timer module 206A resets the registration period of the capability information relating to the terminal device 100B and starts measuring the registration period from 0 again, and in steps 240 and 242, transmits a response signal.

As a result of the processing described above, in step 244, the communication session is established between the terminal device 100A and the terminal device 100B. In this manner, in the information communication system 500, the gateway apparatus 200A registers and manages the capability information relating to the terminal device 100B on the call answering side in the capability information database. Thereby, the fallback processing needed when the communication session is established between the terminal device 100A and the terminal device 100B can be performed between the terminal device 100A and the gateway apparatus 200A on the call requesting side. That is, unlike the related-art information communication system 50 shown in FIG. 13, there is no need to perform the fallback processing until the communication session is established, with the terminal device 100B through the SIP server 300. As a result, the time until the communication session between the terminal devices 100 is established can be reduced, and increase in traffic of the communication network 40 due to the fallback processing can be suppressed.

[3-3. Flow of Erasure Processing of Capability Information by a Timer]

Next, a flow of the automatic erasure processing of the capability information managed by the timer module 206 is described.

Figure 5:
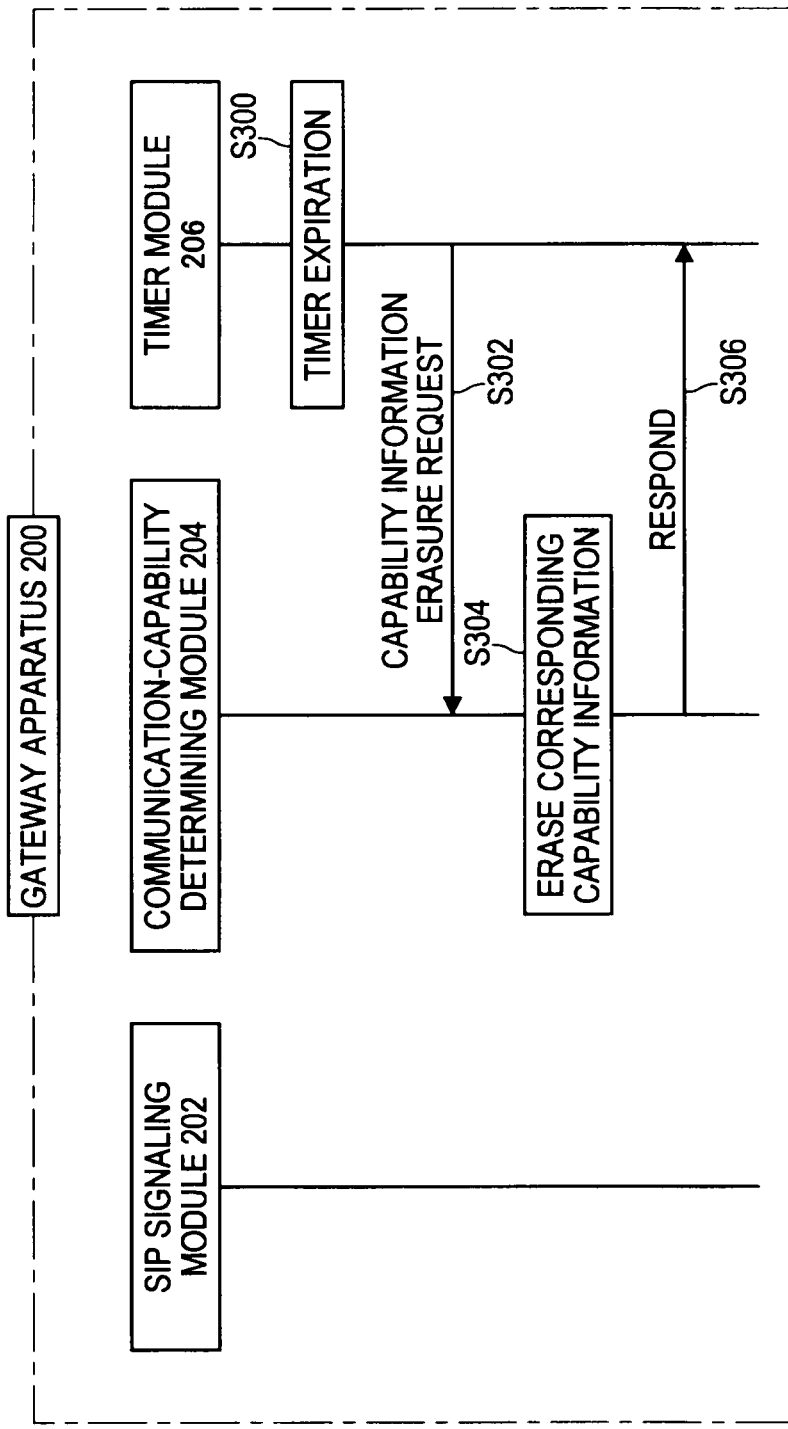
FIG. 5 is a sequence diagram showing an example of a flow of processing in which the capability information registered in the gateway apparatus 200 is automatically erased in the information communication system 500 according to the embodiment.

FIG. 5 is a sequence diagram showing an example of the flow of the processing of automatically erasing the capability information registered in the communication capability database managed by the gateway apparatus 200 in the information communication system 500 according to the present embodiment.

As shown in FIG. 5, when in step 300, the timer module 206 determines that the registration period of the capability information relating to the predetermined terminal device 100 exceeds the period set in advance, the timer module 206 instructs the erasure of the capability information to the communication-capability determining module 204. That is, in step 302, the timer module 206 instructs the communication-capability determining module 204 to erase the capability information of interest from the communication capability database.

In response, the communication-capability determining module 204 erases the corresponding capability information from the capability information database in step 304, and transmits a response signal to the timer module 206 in step 306.

As a result, the gateway apparatus 200 can automatically erase the capability information relating to the terminal device 100 for which no communication session has been established for the predetermined period. Thereby, it is possible to prevent the fallback processing from being performed based on the old capability information.

As described above, by using the information communication system 500 according to the present embodiment, the gateway apparatus 200 can cache the result of the fallback processing, and can register and manage, in the communication capability database, the capability information of the predetermined terminal device 100. Thereby, it is possible to perform the fallback processing between the terminal device 100A and the gateway apparatus 200A when the communication session is established between the terminal device 100A on the call requesting side and the terminal device 100B on the call answering side. As a result, by the use of the information communication system 500 according to the present embodiment, it is possible to reduce the time until the communication session between the terminal devices 100 is established, and to suppress increase in traffic of the communication network 40 due to the fallback processing.

While in the foregoing explanation, the case where a call is made from the terminal device 100A to the terminal device 100B has been described, the present invention is not limited to this. For example, when a call is made from the terminal device 100B to the terminal device 100A, after the fallback processing is performed between the terminal device 100B and the gateway apparatus 200B, the communication session is established.

Moreover, in the information communication system 500 according to the present embodiment, all the terminal devices 100 under a gateway apparatus 200 can use the capability information relating to a plurality of terminal devices 100 registered in the gateway apparatus 200. For example, suppose that three terminal devices 100*a*, 100*b*, 100*c* exist under a certain gateway apparatus 200*a*, and that a communication session is to be established with a terminal device 100*d* under another gateway apparatus 200*b*. Here, for example, once the communication session has been established between the terminal device 100*a* and the terminal device 100*d*, the gateway apparatus 200*a* has registered the capability information relating to the terminal device 100*d* in the capability information database. Accordingly, even when for the first time, the terminal device 100*b* or the terminal device 100*c* is to establish a communication session with the terminal device 100*d*, the fallback processing is performed between the terminal device 100*b* or the terminal device 100*c* and the gateway apparatus 200*a*. In this manner, by caching the fallback information and managing the capability information of the respective terminal devices 100 by the gateway apparatus 200, it is possible to realize reduction in time until the communication session is established and suppression of traffic in the overall information communication system 500.

<4. Modifications>

In the above-described information communication system 500, changing the specification and the like of the gateway apparatus 200 as necessary allows the communication session between the terminal devices 100 to be more efficiently established. Hereinafter, various modifications of the foregoing information communication system 500 are described.

[4-1. Modification 1 (an Example in which Capability Information is Updated in Accordance with Update of the Communication Standard of the Terminal Device)]

In the above-described embodiment, the case has been described where the terminal device 100A is the terminal device for television conference that supports H.264 (moving image compression standard) and the like, and the terminal device 100B is the terminal device for G.711 (audio encoding standard) voice telephone that only supports IPv4. Here, for example, it is also assumed that by installation, version upgrade of software and the like, the communication standard supported by the terminal device 100B may be updated. In the information communication system 500 of Modification 1, when the communication standard supported by the terminal device 100 is updated, the gateway apparatus 200 can update the capability information relating to the terminal device 100.

Hereinafter, a flow of update processing of the capability information in the information communication system 500 of Modification 1 having the above-described characteristic is described.

Figure 6:
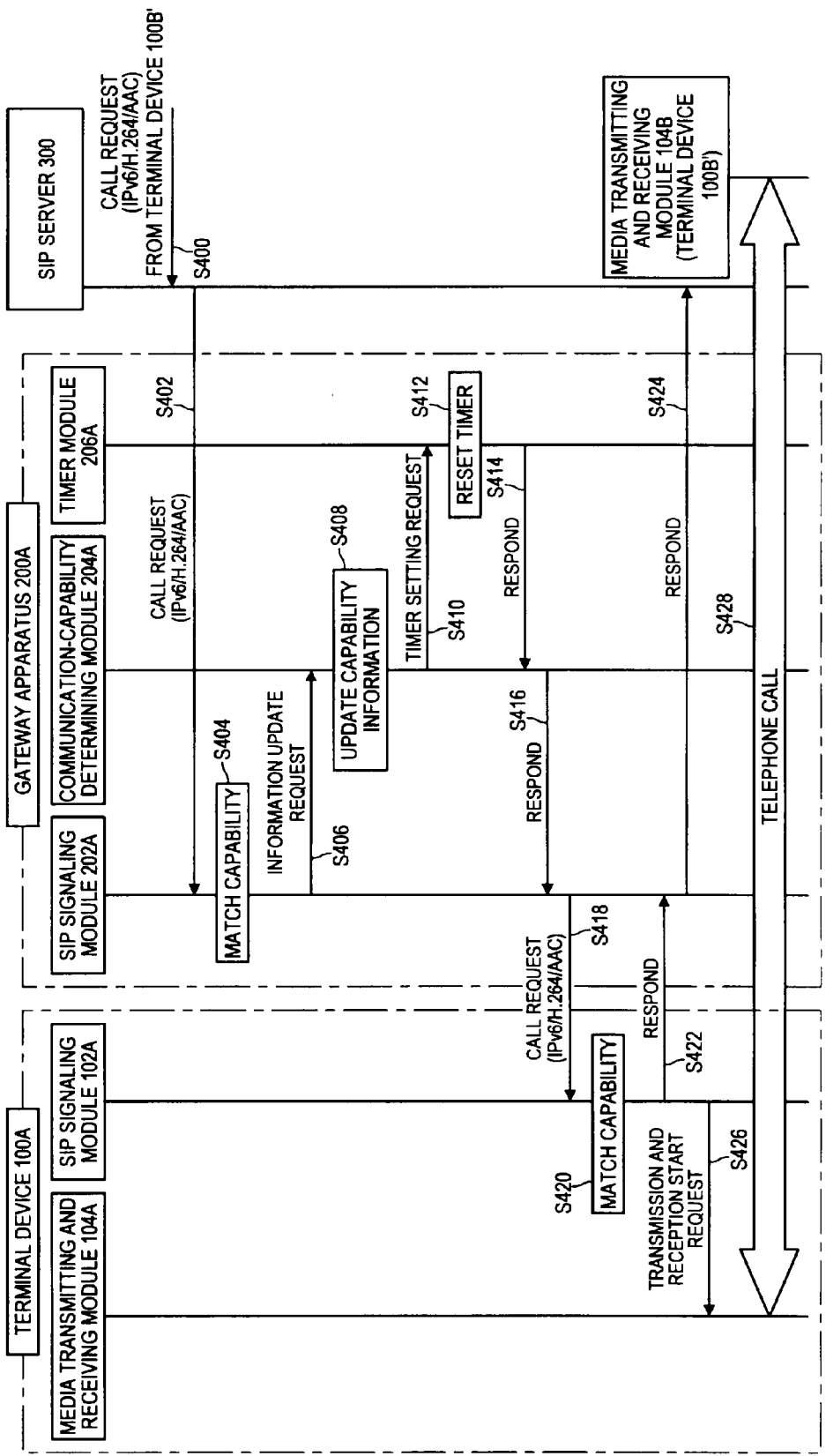
FIG. 6 is a sequence diagram showing an example of a flow of processing in which when a communication standard supported by a terminal device 100 is updated, the gateway apparatus 200 updates the capability information in the information communication system 500 of Modification 1.

FIG. 6 is a sequence diagram showing an example of the flow of the processing in which the gateway apparatus 200 updates the capability information when the communication standard supported by the terminal device 100 is updated in the information communication system 500 according to the present embodiment. In the following explanation, a case where the terminal device 100B is updated from the terminal device for G.711 (audio encoding standard) voice telephone to the terminal device 100B' for television conference that supports H.264 (moving image compression standard) and the like. Accordingly, the processing shown in FIG. 6 is an example of the flow of the processing in the information communication system 500 when after the update to the terminal device 100B', a call request is made from the terminal device 100B' to the terminal device 100A. The "terminal device 100B" and the "terminal device 100B'" are the identical terminal device, and the communication standard supported by this terminal device is updated by the installation, version upgrade or the like of the software.

In the sequence diagram shown in FIG. 6, for convenience of explanation, processing by the gateway apparatus 200B and the terminal device 100B' on the call requesting side is omitted. Needless to say, as in the information communication system 500 according to the above-described embodiment, the transmission and reception processing of various signals is performed between the SIP server 300, the gateway apparatus 200B and the terminal device 100B' on the call requesting side.

First, the terminal device 100B' makes a call request to the terminal device 100A similarly to the call request processing from the terminal device 100A to the terminal device 100B, which has been described in the above-described embodiment. That is, the SIP signaling module 102B of the terminal device 100B' requests reception start to a media transmitting and receiving module 104B in response to a telephone-call start instruction from the user. At the same time, the SIP signaling module 102B makes a call to the terminal device 100A with IPv6/H.264/MPEG4-AAC. That is, the SIP signaling module 102B transmits the call request to the gateway apparatus 200B.

In response, an SIP signaling module 202B of the gateway apparatus 200B performs the capability matching processing based on the capability information relating to the terminal device 100A, and then transmits the call request to the SIP server 300 in step 400. Thereafter, the SIP server 300 transmits the call request transmitted from the terminal device 100B' to the gateway apparatus 200A in step 402.

In response, the SIP signaling module 202A of the gateway apparatus 200A performs the capability matching processing in step 404, and instructs the update of the capability information relating to the terminal device 100B' to the communication-capability determining module 204A in step 406. The communication-capability determining module 204A updates the capability information relating to the terminal device 100B' in step 408. That is, the communication-capability determining module 204A updates the capability information (G.711 and the like) relating to the terminal device 100B, which has been registered in the communication capability database, to the capability information relating to the terminal device 100B' (IPv6/H.264 and the like).

Furthermore, in step 410, the communication-capability determining module 204A instructs the timer module 206A to update the registration period of the capability information of the terminal device 100B'. In response, the timer module 206A resets the registration period of the capability information relating to the terminal device 100B and starts measuring the registration period from 0 again, and in steps 414 and 416, transmits a response signal.

Thereafter, the SIP singling module 202A transmits the call request to the terminal device 100A in step 418. In response, the SIP signaling module 102A of the terminal device 100A can determine that the telephone call with the terminal device 100B' can be started by performing the capability matching processing in step 420. Accordingly, the SIP signaling module 102A transmits a response signal to the terminal device 100B' through the SIP server 300 in steps 422 and 424, and requests transmission and reception start to the media transmitting and receiving module 104A in step 426.

As a result of the processing described above, in step 428, the communication session has been established between the terminal device 100B' and the terminal device 100A. In this manner, in the information communication system 500 of Modification 1, in the case where the communication standard supported by the terminal device 100 on the call requesting side is updated, the gateway apparatus 200 on the call answering side updates the capability information relating to the terminal device 100 on the call requesting side when the call request is made from the terminal device 100. This allows the gateway apparatus 200 to typically manage the latest capability information of the respective terminal devices 100. As a result, when after the processing shown in FIG. 6, an call is made from the terminal device 100A to the terminal device 100B', the gateway apparatus 200A can perform the capability matching processing based on the latest capability information relating to the terminal device 100B' (IPv6/H.264 and the like). Accordingly, by the use of the information communication system 500 of Modification 1, it is possible to reduce the time until the communication session between the terminal devices 100 is established, and to suppress increase in traffic of the communication network 40 due to the fallback processing.

In the example shown in FIG. 6, the case has been described where when the call request is made from the terminal device 100B' whose communication standard has been updated to the terminal device 100A, the gateway apparatus 200A updates the capability information registered in the capability information database. The present invention, however, is not limited to this. For example, when the supported communication standard is updated, the terminal device 100B' may request the erasure of the old capability information to the gateway apparatus 200A connected to the terminal device 100A without making the call to the terminal device 100A. Hereinafter, a flow of the processing when the terminal device 100B' requests the erasure of the capability information to the gateway apparatus 200A is described.

Figure 7:
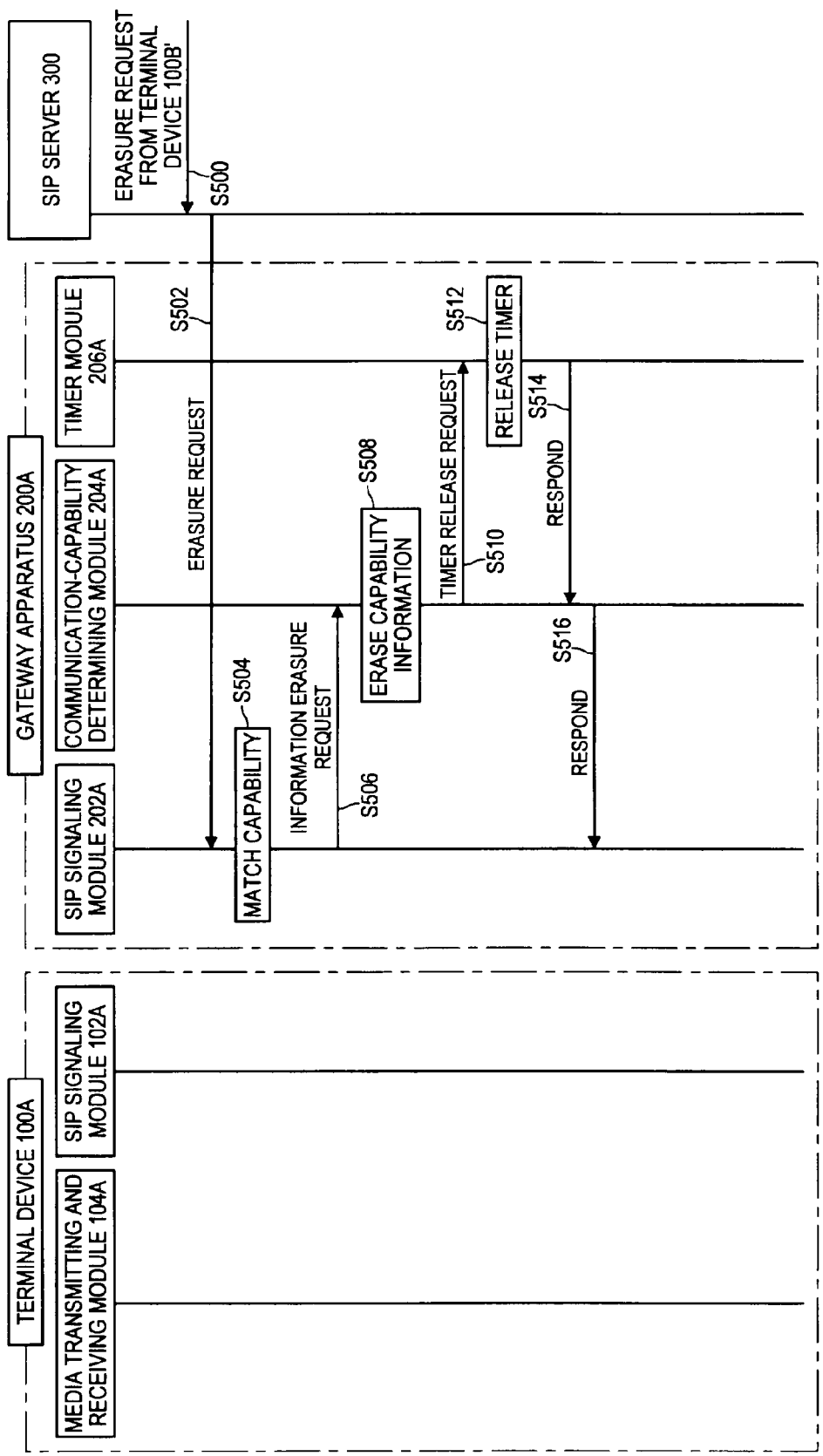
FIG. 7 is a sequence diagram showing an example of a flow of processing when a terminal device 100B' requests erasure of the capability information to a gateway apparatus 200A in the information communication system 500 of Modification 1.

FIG. 7 is a sequence diagram showing an example of the flow of the processing when the terminal device 100B' requests the erasure of the capability information to the gateway apparatus 200A.

When the supported communication standard is updated, the terminal device 100B' requests the erasure of the capability information relating to the terminal device 100B' registered in the gateway apparatus 200A. That is, the SIP signaling module 102B of the terminal device 100B' requests the erasure of the capability information to the gateway apparatus 200A through the SIP server 300 in steps 500 and 502.

FIG. 8 is an explanatory diagram showing an example of message information of an erasure command of the capability information transmitted from the terminal device 100B'. As shown in FIG. 8, the terminal device 100B' transmits, to the gateway apparatus 200A, the message information including "remove all" meaning the erasure command of the capability information. The message information shown in FIG. 8 is an example for explaining the present modification, and the content of the message information are not limited to this.

In response, in step 504, the SIP signaling module 202A of the gateway apparatus 200A performs the capability matching processing of determining whether or not the capability information related to the erasure request transmitted from the terminal device 100B' has been registered in the communication capability database. The SIP signaling module 202A can confirm whether or not the capability information relating to the terminal device 100B' has been registered, based on a source address and the like included in the message information shown in FIG. 8. When the capability information relating to the terminal device 100B' has been registered in the communication capability database, the SIP signaling module 202A instructs the erasure of the capability information of interest to the communication-capability determining module 204A in step 506.

Thereafter, in step 508, the communication-capability determining module 204A erases the capability information relating to the terminal device 100B', which has been registered in the communication capability database. Furthermore, in step 510, the communication-capability determining module 204A instructs the timer module 206A to stop the measurement of the registration period of the capability information relating to the terminal device 100B' managed by the timer module 206A. In response, the timer module 206A stops the measurement of the registration period of the capability information relating to the terminal device 100B' in step 512, and transmits a response signal in steps 514 and 516.

Thereby, the capability information relating to the terminal device 100B' will be erased from the communication capability database managed by the gateway apparatus 200A.

In this manner, in the information communication system 500 of Modification 1, when the communication standard supported by the terminal device 100 is updated, the terminal device 100 can instruct, to a plurality of gateway apparatuses 200, the erasure of the capability information relating to the terminal device 100. As a result, each of the gateway apparatuses 200 can erase, from the communication capability database, the capability information relating to the terminal device 100 that has transmitted the erasure request. Accordingly, even when another terminal device 100 makes a call to the terminal device 100 whose communication standard has been updated, the processing of establishing the communication session based on the old capability information can be securely prevented from being performed.

Needless to say, when the communication standard supported by the terminal device 100 is updated, the terminal device 100 may instruct a plurality of gateway apparatuses 200 to update the capability information relating to the terminal device 100 of interest. Whether the terminal device 100 requests the erasure of the capability information or the update of the capability information, or the capability information is maintained until a call request is made can be designed and changed as necessary, depending on the specification, cost and the like required in the information communication system 500.

[4-2. Modification 2 (an Example in which the Use of Capability Information is Limited)]

In the information communication system 500 according to the above-described embodiment, the communication session can also be established without using the capability information registered in the communication capability database managed by the gateway apparatus 200. For example, when it is known that the communication standard of the terminal device 100 on the counterpart side is updated, when the old capability information is registered, when a call request is made for the first time, and the like, the processing of searching the communication capability database by the gateway apparatus 200 may be wasteful. Consequently, in the information communication system 500 of Modification 2, it is also possible to establish a communication session in response to a request from the terminal device 100 without using the foregoing communication capability database.

Specifically, in establishing the communication session, the terminal device 100 transmits, to the gateway apparatus 200, a call request including information instructing the establishment of the communication session without using the cached information (capability information relating to the terminal device 100 on the call answering side) in the message information thereof. FIG. 9 is an explanatory diagram showing an example of the message information of the call request transmitted from the terminal device 100 to the gateway apparatus.

As shown in FIG. 9, the terminal device 100 transmits, to the gateway apparatus 200, the massage information including "cache-control=no-cache" meaning a command not to use the capability information. The massage information shown in FIG. 9 is an example for explaining the present modification, and the content of the message information is not limited to this.

The gateway apparatus 200 received this massage information establishes a communication session by the processing in step 110 and subsequent steps shown in FIG. 2 without searching for capability information from the communication capability database. That is, the fallback processing similar to that in the related-art method is performed between the terminal devices 100 until the communication session has been established.

In this manner, the terminal device 100 can also arbitrarily establish a communication session without using capability information managed by the gateway apparatus 200. As a result, for example, when it is known that the communication standard of the terminal device 100 on the counterpart side is updated, when old capability information is registered, when a call request is made for the first time, and the like, it is possible to prevent the time until the communication session is established from being actually prolonged.

[4-3. Modification 3 (an Example in which Capability Information of a Plurality of Gateway Apparatuses 200 is Collectively Managed)]

As described above, in the information communication system 500 according to the above-described embodiment, gateway apparatuses 200 manage capability information, so that all the terminal devices 100 under the gateway apparatuses 200 can use the capability information of interest. However, since the gateway apparatuses 200 manage different communication capability databases, a situation where capability information of a predetermined terminal device 100 managed by a gateway apparatus 200 is not managed by another gateway apparatus 200 can be assumed. In this case, in order to establish a communication session between the terminal devices 100, the fallback processing may need to be performed between the terminal devices 100. Here, in the information communication system 500 of Modification 3, by further including a communication capability server 400 that collectively manages capability information managed by the plurality of gateway apparatuses 200, the above-described issue can also be solved. Hereinafter, in the information communication system 500 of Modification 3, a flow of registration/acquisition processing of capability information using the communication capability server 400 is described.

Figure 10:
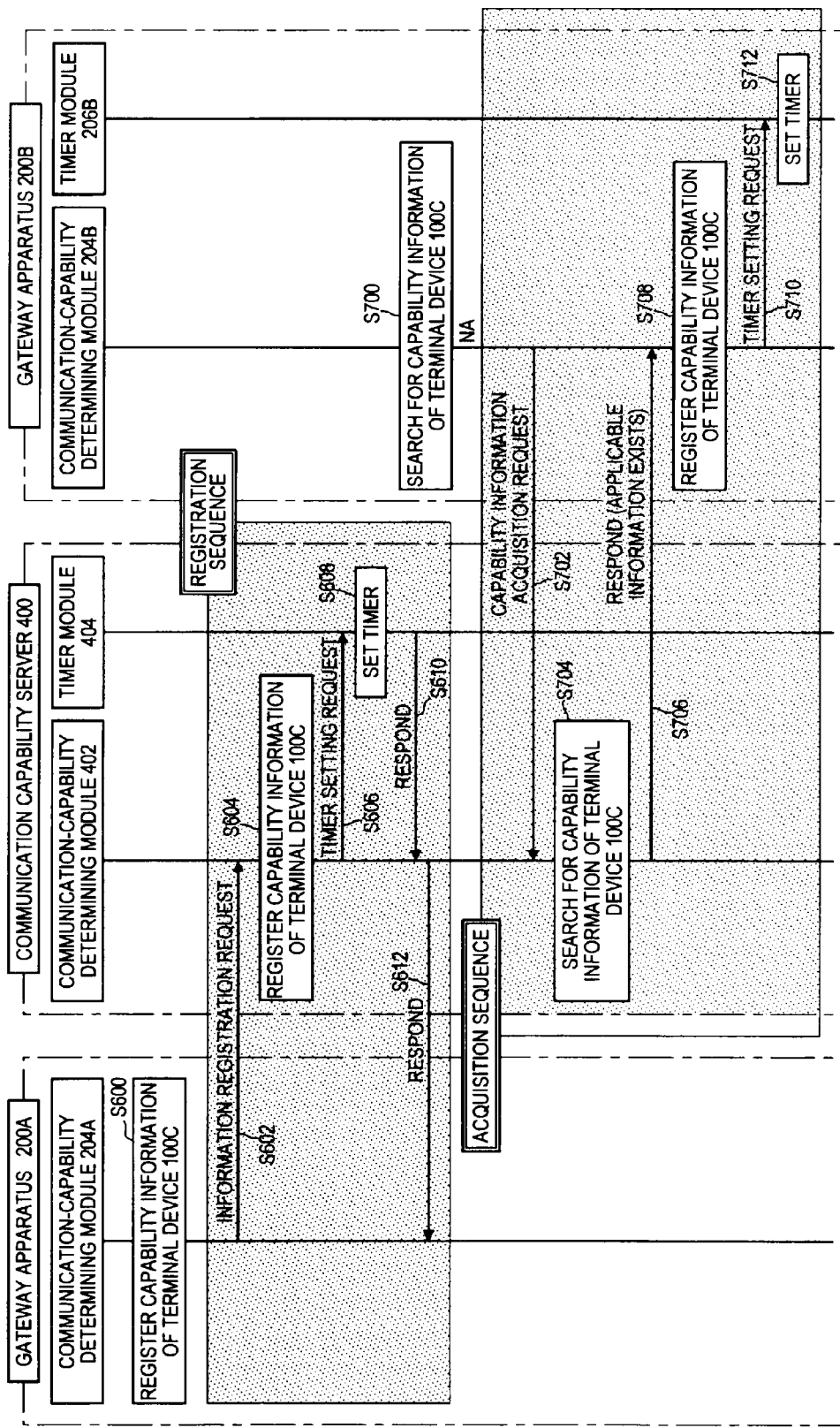
FIG. 10 is a sequence diagram showing an example of a flow of registration/acquisition processing of the capability information using a communication capability server 400 in the information communication system 500 of Modification 3.

FIG. 10 is a sequence diagram showing an example of a flow of registration/acquisition processing of the capability information using the communication capability server 400 in the information communication system 500 of Modification 3. While in the following explanation, a case where two gateway apparatuses 200A and 200B exist under the communication capability server 400 is taken as an example, needless to say, three or more gateway apparatuses 200 can exist under the communication capability server 400. Moreover, the communication capability server 400 includes a communication capability determining module 402 and a timer module 404 as in the gateway apparatus 200. Moreover, the communication capability server 400 manages a communication capability database in which the capability information relating to the respective terminal devices 100 is registered.

As shown in FIG. 10, when the gateway apparatus 200A registers the capability information of a certain terminal device 100C in the capability information database in step 600, the gateway apparatus 200A transmits the capability information to the communication capability server 400 in step 602. The registration processing of the capability information relating to the terminal device 100C in step 600 is performed when a communication session is established between the terminal device 100A and the terminal device 100C, as described in step 142 of FIG. 2.

Thereafter, the communication-capability determining module 402 of the communication capability server 400 registers the capability information relating to the terminal device 100C in the communication capability database in step 604. Moreover, the communication-capability determining module 402 instructs the timer module 404 to start measurement of the registration period of the capability information relating to the terminal device 100C in step 606. In response, the timer module 404 starts the measurement of the registration period of the capability information relating to the terminal device 100C in step 608, and transmits a response signal to the gateway apparatus 200A in steps 610 and 612. When the capability information of the terminal device 100C has been registered in the communication capability database managed by the communication capability server 400, the timer module 404 resets the registration period of the capability information relating to the terminal device 100C and restarts the measurement of the registration period from 0 in step 608.

The above-described processing in steps 602 to 612 allows the capability information relating to the terminal device 100C managed in the gateway apparatus 200A to be managed also in the communication capability server 400. Hereafter, a flow of the processing is described in which the capability information relating to the terminal device 100C, which has been registered in the communication capability database managed by the communication capability server 400, is to be acquired by another gateway apparatus 200B not having the corresponding capability information in the manner as described above.

Processing in steps 700 to 712 of FIG. 10 is a part of processing performed when the terminal device 100B under the gateway apparatus 200B makes a call request to the terminal device 100C. That is, a communication-capability determining module 204B of the gateway apparatus 200B searches for the capability information relating to the terminal device 100C from the capability information database in step 700. Since a flow of the processing when the call request is made from the terminal device 100B is similar to the processing in steps 100 to 106 of FIG. 2, details thereof are omitted here.

Here, when the terminal device 100B makes a call request to the terminal device 100C for the first time, the capability information relating to the terminal device 100C has not been registered in a communication capability database of the gateway apparatus 200B. In this case, the gateway apparatus 200B acquires the capability information relating to the terminal device 100C from the communication capability server 400 by the processing in steps 702 to 712.

Specifically, in step 702, the communication-capability determining module 204B of the gateway apparatus 200B requests the acquisition of the capability information relating to the terminal device 100C to the communication capability server 400.

In response, the communication-capability determining module 402 of the communication capability server 400 searches for the capability information relating to the terminal device 100C from the communication capability database in step 704, and transmits a response signal to the gateway apparatus 200B in step 706. As described above, in the present example, by the processing in steps 602 to 612 as described above, the capability information relating to the terminal device 100C has been registered in the communication capability database managed by the communication capability server 400 via the gateway apparatus 200A. Accordingly, the communication-capability determining module 402 can transmit the capability information relating to the terminal device 100C to the gateway apparatus 200B in step 706.

Thereafter, in step 708, the communication-capability determining module 204B of the gateway apparatus 200B registers, in the communication capability database, the capability information relating to the terminal device 100C received from the communication capability server 400. Furthermore, in step 710, the communication-capability determining module 204B of the gateway apparatus 200B instructs the measurement start of the registration period of the capability information relating to the terminal device 100C to a timer module 206B. In response, in step 712, the timer module 206B starts the measurement of the registration period of the capability information relating to the terminal device 100C.

The above-described processing in steps 702 to 712 allows the gateway apparatus 200B to acquire the capability information relating to the terminal device 100C managed in the communication capability server 400 and to manage the same. Thereafter, by the processing in steps 210 to 244 shown in FIG. 4, a communication session is established between the terminal device 100B and the terminal device 100C. That is, even when the terminal device 100B makes a call request to the terminal device 100C for the first time, the fallback processing needed until the establishment of the communication session can be performed between the terminal device 100B and the gateway apparatus 200B. As described above, by the use of the information communication system 500 of Modification 3, it is possible to reduce further the time until the communication session between the terminal devices 100 is established, and to suppress further the traffic of the communication network 40 due to the fallback processing.

The sequence diagram shown in FIG. 10 is an example for explaining the characteristics of the information communication system 500 of Modification 3 above, and the system configuration and the flow of the processing are not limited to these. In the above-described modification 3, it is one of characteristics that the communication capability server 400 collectively manages the capability information managed by a plurality of gateway apparatuses 200, which allows each of the gateway apparatuses 200 to easily acquire capability information managed by other gateway apparatuses 200. Accordingly, the number of the gateway apparatuses 200 existing under the communication capability server 400, the number of the terminal devices 100 existing under each of the gateway apparatuses 200, the supported communication standards and the like are not limited to specific ones.

<5. Hardware Configuration of the Terminal Device 100 and the Gateway Apparatus 200>

Next, an example of a hardware configuration of the terminal device 100 constituting the foregoing information communication system 500 is described. The gateway apparatus 200 can also have a hardware configuration similar to that of the terminal device 100 described below.

Figure 11:
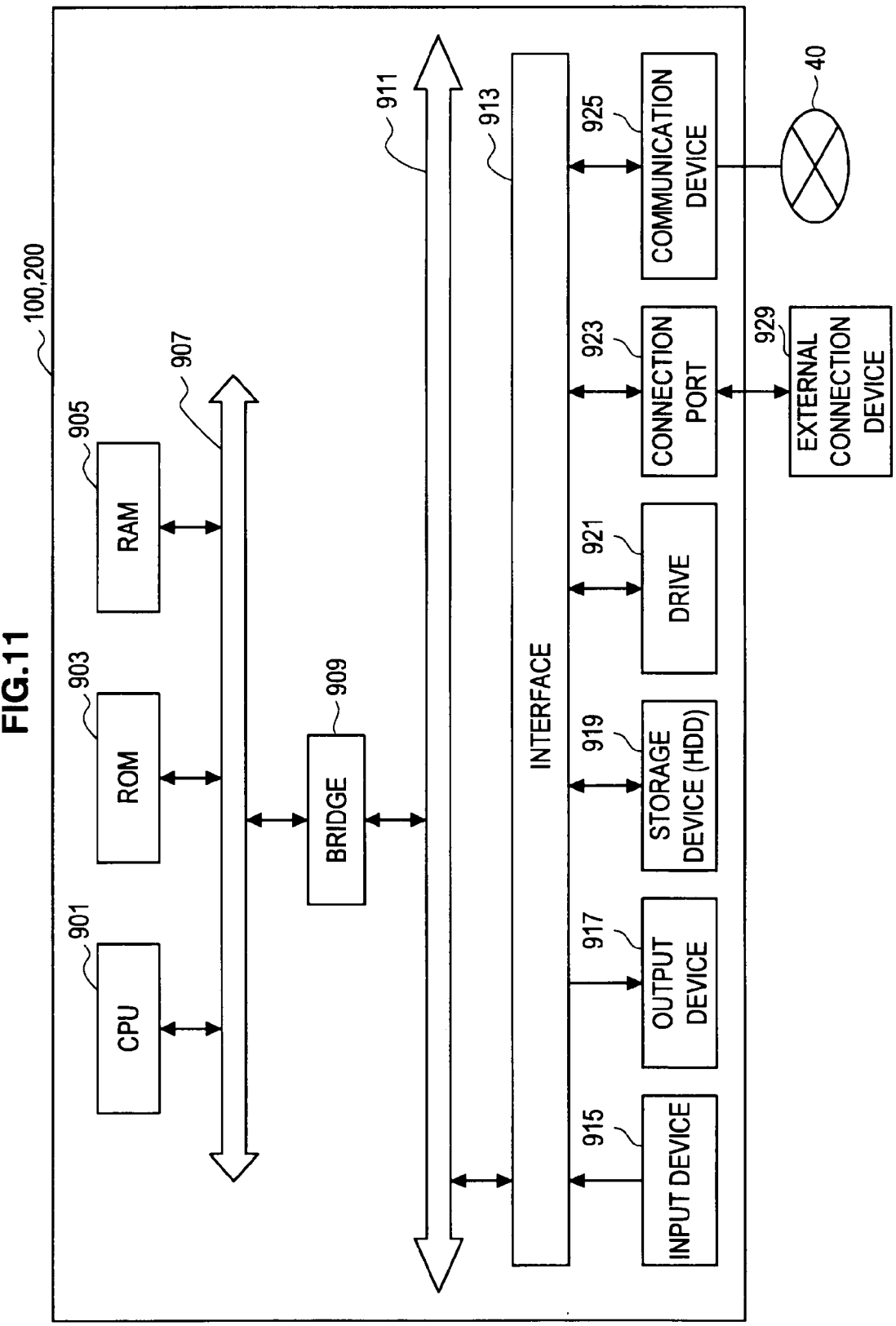
FIG. 11 is a block diagram showing an example of a hardware configuration of the terminal device 100 and the gateway apparatus 200 constituting the information communication system 500 according to the embodiment.

FIG. 11 is a block diagram showing an example of the hardware configuration of the terminal device 100 constituting the information communication system 500 according to the present embodiment. The terminal device 100 according to the present embodiment mainly includes a CPU 901, a ROM 903, a RAM 905, a bridge 909, an interface 913, an input device 915, an output device 917, a storage device 919, a drive 921, a connection port 923 and a communication device 925.

The CPU 901 functions as an arithmetic operation device and a control device, and controls overall operation or a part thereof in the terminal device 100 in accordance with various programs recorded on the ROM 903, the RAM 905, the storage device 919, or a removable recording medium 927. The ROM 903 stores programs, arithmetic operation parameters and the like that the CPU 901 uses. The RAM 905 temporarily stores the programs used in the execution of the CPU 901, parameters which vary as necessary in the execution and the like. These are interconnected through a host bus 907 constituted by an internal bus such as a CPU bus.

The input device 915 is operation means that the user operates, such as a mouse, a keyboard, a touch panel, buttons, switches, and levers.

The output device 917, for example, includes a display device such as a CRT display, a liquid crystal display, a plasma display and an EL display, and the like. Also, the output device 917 includes a device capable of acoustically notifying the user of acquired information, such as an audio output device such as a speaker.

The storage device 919 is a device for data storage as an example of a storage unit of the terminal device 100. The storage device 919, for example, is constituted by a magnetic storage device such as a HDD (Hard Disk Drive), a semiconductor storage device, an optical storage device, an optical-magnetic storage device or the like.

The drive 921 is a reader/writer for recording medium, and is integrated in, or externally attached to the terminal device 100. The drive 921 reads information recorded on a removable recording medium such as an attached magnetic disk, optical disk, optical-magnetic disk, or semiconductor memory to output the information to the RAM 905. Moreover, the drive 921 can also write data and the like in the attached removable recording medium.

The connection port 923 is a port for connecting directly to external connection device 929, for example, such as a USB port, an optical audio terminal, an IEEE1394 port, a SCSI port and an HDMI port.

The communication device 925 is, for example, a communication interface constituted by, for example, a communication device for connecting to the communication network 40, and the like. The communication device 925 is, for example, a wired or wireless LAN, Bluetooth, a router for optical communication, a router for ADSL, modems for various communications or the like.

As described above, an example of the hardware configuration which makes it possible to realize the functions of the terminal device 100 and the gateway apparatus 200 constituting the above-described information communication system 500 has been shown. Each of the above-described components may be made using general members or may be made with hardware dedicated for the functions of the respective components. Accordingly, the used hardware configuration can be changed as necessary in accordance with a technical level at the time when the present embodiment is carried out.

<6. Conclusion>

As described above, in the information communication system 500 according to an embodiment of the present invention, the gateway apparatus 200 can cache the result of the fallback processing. Moreover, the gateway apparatus 200 can register the information relating to the communication capability of the terminal device 100 on the counterpart side in the communication capability database, based on the cached result of the fallback processing. Thereby, when a terminal device 100 makes an call to another terminal device 100, the fallback processing needed until the establishment of the communication session can be performed between the terminal device 100 and the gateway apparatus 200 in the same LAN without performing the fallback processing between the terminal devices 100. As a result, the time until the communication session between the terminal devices 100 is established can be reduced, and increase in traffic of the communication network 40 due to a call request signal, an error signal and the like can be suppressed. Moreover, by further including the communication capability server 400 that collectively manages capability information relating to each of the terminal devices 100 managed by a plurality of gateway apparatuses 200, the capability information relating to the respective terminal devices 100 can be shared among the gateway apparatuses 200. As a result, by the use of the information communication system 500, it is possible to reduce further the time until the communication session between the terminal devices 100 is established, and to suppress further increase in traffic of the communication network 40 due to a call request signal, an error signal and the like.

It should be understood by those skilled in the art that various modifications, combinations, sub-combinations and alterations may occur depending on design requirements and other factors insofar as they are within the scope of the appended claims or the equivalents thereof.

For example, while in the above-described embodiment, a description has been given mainly of the case where the establishment of the communication session is requested from the terminal device 100A under the gateway apparatus 200A in one LAN to the terminal device 100B under the gateway apparatus 200B in another LAN, the present invention is not limited to this. For example, the present invention can be obviously applied to a case where three or more LANs are connected through three or more gateway apparatuses 200 to the communication network 40, and a plurality of the terminal devices 100 are connected under each of the gateway apparatuses 200. Moreover, in the respective terminal devices 100 and the respective gateway apparatuses 200 as well, the similar processing to that in the terminal device 100A and the gateway apparatus 200A mainly described in the above-described embodiment is performed.

Moreover, the communication standards of the terminal devices 100, the message information exemplified in the above-described embodiment and the like are examples for explaining the above-described embodiment, and the present invention is not limited to this. That is, in the above-described embodiment, it is one of characteristics that the gateway apparatus 200 manages the capability information of the terminal device 100, and the communication capability itself of the terminal device 100 is not limited to the specific capability.

Moreover, in the present specification, the steps described in the sequence diagrams include not only the processing performed chronologically in the described order, but also the processing performed in parallel or individually instead of being performed chronologically. Moreover, needless to say, the order in which the steps are performed chronologically may eventually be changed as necessary.

The present application contains subject matter related to that disclosed in Japanese Priority Patent Application JP 2009-006727 filed in the Japan Patent Office on Jan. 15, 2009 the entire content of which is hereby incorporated by reference.

What is claimed is:

1. A gateway apparatus connected to at least one or more terminal devices in a first network, comprising:
    a signaling module that relays transmission and reception of information using a different one of a plurality of communication standards until a communication session between a terminal device in the first network and a terminal device in a second network has been established;
    a communication capability database in which capability information including information relating to communication capabilities of a plurality of terminal devices is registered; and
    a communication-capability determining module that registers and manages, in the communication capability database, capability information used to determine one of the plurality of communication standards that establishes the communication session between the terminal device in the first network and the terminal device in the second network.

2. The gateway apparatus according to claim 1, wherein
    when a call request is made from the terminal device on a call requesting side in the first network to the terminal device on a call answering side in the second network the communication-capability determining module searches for the capability information of the terminal device on the call answering side from the communication capability database,
    the signaling module determines whether or not the terminal device on the call answering side supports a communication standard of the call request, based on the capability information of the terminal device on the call answering side registered in the communication capability database,
    when the communication standard is determined to be supported, the signaling module transmits the call request to the terminal device on the call answering side, and
    when the communication standard is determined not to be supported, the signaling module transmits an error signal to the terminal device on the call requesting side.

3. The gateway apparatus according to claim 2, further comprising:
    a timer module that manages a period during which the capability information is registered in the communication capability database for each of the terminal devices, wherein every time a communication session with a terminal device associated with capability information registered in the communication capability database is established, the timer module resets the registration period of the respective capability information in the communication capability database.

4. The gateway apparatus according to claim 3, wherein
    the timer module instructs the communication-capability determining module to erase capability information for a predetermined terminal device from the communication capability database when the registration period of the capability information for the predetermined terminal device exceeds a predetermined period set in advance, and
    the communication-capability determining module erases the corresponding capability information from the communication capability database in response to the instruction from the timer module.

5. The gateway apparatus according to claim 4, wherein
    in a case where a call request is made from the terminal device in the second network to the terminal device in the first network, when the communication standard of the call request and the communication standard included in the capability information of the terminal device in the second network, which is registered in the communication capability database, are different, the communication-capability determining module updates the capability information of the terminal device making the call request, which is registered in the communication capability database, to new capability information including the communication standard of the call request.

6. The gateway apparatus according to claim 1, wherein
    the capability information registered in the communication capability database includes address information of the terminal device in the first network and the terminal device in the second network, communication protocol information, video codec information, audio codec information, or a combination thereof.

7. The gateway apparatus according to claim 1, wherein
    the communication-capability determining module also registers and manages, in the communication capability database, capability information used to determine one of the plurality of communication standards that fails to establish the communication session between the terminal device in the first network and the terminal device in the second network.

8. An information processing method by a gateway apparatus, comprising the steps of:
    relaying, by a gateway apparatus connected to at least one or more terminal devices, transmission and reception of information using a different one of a plurality of communication standards until a communication session between a terminal device connected to the gateway apparatus in a first network and a terminal device in a second network has been established; and
    registering and managing, in a communication capability database, capability information including information used to determine one of the plurality of communication standards that establishes the communication session between the terminal device in the first network and the terminal device in the second network.

9. A non-transitory computer-readable storage medium having program instructions stored therein, which when executed by a computer, causes the computer to perform a method, comprising:
    relaying, by a gateway apparatus connected to at least one or more terminal devices, transmission and reception of information using a different one of a plurality of communication standards until a communication session between a terminal device connected to the gateway apparatus in a first network and a terminal device in a second network has been established; and registering and managing, in a communication capability database, capability information including information used to determine one of the plurality of communication standards that establishes the communication session between the terminal device in the first network and the terminal device in the second network.

10. An information communication system that establishes a communication session between terminal devices though a gateway apparatus, the system comprising:

a first terminal device including a first signaling module that transmits a call request to a second terminal device in a second network toward the gateway apparatus connected to the first terminal device in a first network, and the gateway apparatus including a second signaling module that relays, in response to the call request from the first signaling module, transmission and reception of information using a different one of a plurality of communication standards until a communication session between the first terminal device in the first network and the second terminal device in the second network has been established;

a communication capability database in which capability information including information relating to communication capabilities of a plurality of terminal devices is registered; and a communication-capability determining module that registers and manages the capability information used to determine the one of the plurality of communication standards that establishes the communication session between the first terminal device in the first network and the second terminal device in the second network in the communication capability database.

11. The information communication system according to claim 10, wherein the communication-capability determining module searches for the capability information of the second terminal device on a call answering side from the communication capability database in response to the call request from the first signaling module of the first terminal device on a call requesting side in the first network, the second signaling module determines whether or not the second terminal device on the call answering side supports a communication standard of the call request, based on the capability information of the second terminal device on the call answering side registered in the communication capability database, when the communication standard is determined to be supported, the second signaling module transmits the call request to the second terminal device on the call answering side, when the communication standard is determined not to be supported, the second signaling module transmits an error signal to the first terminal device on the call requesting side, and the first signaling module of the first terminal device on the call requesting side retransmits a call request based on a different one of the plurality of communication standards to the gateway apparatus in response to reception of the error signal.

12. The information communication system according to claim 11, wherein when the first signaling module transmits, to the gateway apparatus, the call request including information commanding not to use the capability information therein, the second signaling module transmits the call request to the second terminal device on the call answering side, without determining whether or not the second terminal device on the call answering side supports the communication standard on the call requesting side based on the capability information.

13. The information communication system according to claim 12, wherein when the communication standard supported by the second terminal device is updated, the first signaling module transmits an erasure command of the capability information to the gateway apparatus in the network different from that of the second terminal device, and the communication-capability determining module of the gateway apparatus that has received the erasure command erases the capability information related to the erasure command from the communication capability database.

14. The information communication system according to claim 12, further comprising:

a communication capability server that collectively manages the capability information registered in communication capability databases included in a plurality of gateway apparatuses, wherein the communication-capability determining module of each of the plurality of gateway apparatuses is configured to register capability information of a respective terminal device in a respective communication capability database and then, transmit the capability information of the respective terminal device to the communication capability server, and the communication capability server manages the capability information received from the communication-capability determining modules of the gateway apparatuses.

15. The information communication system according to claim 14, wherein when the capability information of the second terminal device on the call answering side is not registered in the communication capability database, the communication-capability determining module of the gateway apparatus acquires the capability information of the second terminal device on the call answering side from the communication capability server, and registers the capability information in the communication capability database.

* * * * *